United States Patent
He et al.

(10) Patent No.: US 10,104,374 B2
(45) Date of Patent: Oct. 16, 2018

(54) INTER-LAYER PARAMETER SET FOR HEVC EXTENSIONS

(71) Applicant: Vid Scale, Inc., Wilmington, DE (US)

(72) Inventors: Yong He, San Diego, CA (US); Yan Ye, San Diego, CA (US); Yuwen He, San Diego, CA (US); Xiaoyu Xiu, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 147 days.

(21) Appl. No.: 14/898,870

(22) PCT Filed: Jun. 18, 2014

(86) PCT No.: PCT/US2014/042923
§ 371 (c)(1),
(2) Date: Dec. 16, 2015

(87) PCT Pub. No.: WO2014/205067
PCT Pub. Date: Dec. 24, 2014

(65) Prior Publication Data
US 2016/0134868 A1 May 12, 2016

Related U.S. Application Data

(60) Provisional application No. 61/836,552, filed on Jun. 18, 2013, provisional application No. 61/837,116, (Continued)

(51) Int. Cl.
*H04N 19/105* (2014.01)
*H04N 19/112* (2014.01)
(Continued)

(52) U.S. Cl.
CPC ......... *H04N 19/112* (2014.11); *H04N 19/136* (2014.11); *H04N 19/186* (2014.11); *H04N 19/30* (2014.11); *H04N 19/70* (2014.11)

(58) Field of Classification Search
CPC .. H04N 19/112; H04N 19/136; H04N 19/186; H04N 19/30; H04N 19/70
See application file for complete search history.

(56) References Cited

U.S. PATENT DOCUMENTS 78,854 A * 6/1868 Adair ...................... F04B 27/02
417/534
7,535,383 B2 * 5/2009 Segall .................. H04N 19/176
341/50
(Continued)

FOREIGN PATENT DOCUMENTS

CN 102577375 A 7/2012
KR 10-2008-0002951 A1 1/2008
(Continued)

OTHER PUBLICATIONS

Chen J., "SHVC Workding Draft 2", JCTVC-M1008_V1, Apr. 18-26, 2013.*
(Continued)

*Primary Examiner* — Sath V Perungavoor
*Assistant Examiner* — Philip Dang
(74) *Attorney, Agent, or Firm* — Condo Roccia Koptiw LLP

(57) ABSTRACT

A video coding device may provide video data processing. The video coding device may receive a plurality of video representation format subsets. The plurality of video representation format subsets may correspond to a plurality of layers. Each of the plurality of video representation subsets may include one or more video representation parameter values. The video coding device may receive a video representation format subset index (e.g., in a cross-layer parameter set) associated with a current layer. The video coding device may determine, using the video representation format subset index, one of the plurality of video representation format subsets associated with the current layer.

8 Claims, 13 Drawing Sheets

Related U.S. Application Data filed on Jun. 19, 2013, provisional application No. 61/840,380, filed on Jun. 27, 2013, provisional application No. 61/860,221, filed on Jul. 30, 2013.

(51) Int. Cl.
  *H04N 19/70* (2014.01)
  *H04N 19/30* (2014.01)
  *H04N 19/136* (2014.01)
  *H04N 19/186* (2014.01)

(56) References Cited

U.S. PATENT DOCUMENTS

| | | | | |
|---|---|---|---|---|
| 7,742,532 | B2* | 6/2010 | Jeon | H04N 19/105 375/240.24 |
| 7,840,078 | B2* | 11/2010 | Segall | H04N 19/40 382/232 |
| 8,054,885 | B2* | 11/2011 | Jeon | H04N 19/105 375/240.12 |
| 8,059,714 | B2* | 11/2011 | Segall | H04N 19/70 375/240.03 |
| 8,259,800 | B2 | 9/2012 | Wang | |
| 8,325,814 | B2* | 12/2012 | Koo | H04N 19/597 375/240.13 |
| 8,411,746 | B2* | 4/2013 | Chen | H04N 21/23432 375/240.12 |
| 2008/0031345 | A1* | 2/2008 | Segall | H04N 19/30 375/240.19 |
| 2008/0165850 | A1 | 7/2008 | Sagetong et al. | |
| 2009/0147853 | A1 | 6/2009 | Dane et al. | |
| 2010/0316134 | A1* | 12/2010 | Chen | H04N 19/30 375/240.25 |
| 2011/0216833 | A1* | 9/2011 | Chen | H04N 13/0022 375/240.16 |
| 2012/0050475 | A1 | 3/2012 | Tian et al. | |
| 2012/0056981 | A1* | 3/2012 | Tian | H04N 19/597 348/42 |
| 2012/0275517 | A1* | 11/2012 | Boyce | H04N 19/70 375/240.12 |
| 2013/0034170 | A1* | 2/2013 | Chen | H04N 13/00 375/240.25 |

FOREIGN PATENT DOCUMENTS

| TW | 200943967 A | 10/2009 |
|---|---|---|
| WO | WO 2013/116415 A1 | 8/2013 |

OTHER PUBLICATIONS

Chen et al., "MV-HEVC/SHVC HLS: On Inter Layer Prediction Signaling", JCTVC-N0118v2, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, pp. 1-5.
Chen et al., "SHVC Working Draft 2", JCTVC-MI008_v1, Joint Collaborative Team on Video Coding (JCT-VC) of ITU-T SG 16 WP 3 and ISO/IEC JTC 1/SC 29/WG 11, 13 Meeting, Incheon, KR, Apr. 18-26, 2013, 53 pages.
Choi et al., "Parameter Set Design for Redundancy Removal", JCTVC-M0165, Joint Collaborative Team on Video Coding (JCT-VC) of ITU-T SG 16 WP 3 and ISO/IEC JTC 1/SC 29/WG 11, 13th Meeting, Incheon, KR, Apr. 18-26, 2013, pp. 1-5.
Deshpande, Sachin, "Comments On SHVC and MV-HEVC", JCTVC-N0195, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, pp. 1-7.
He et al., "On Inter-Layer Parameter Set", JCTVC-N0212, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, pp. 1-7.
He et al., "On SHVC High Level Syntax", JCTVC-N0217, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, pp. 1-7.
Kang et al., "MV -HEVC/SHVC HLS: On Signalling of Inter-Layer RPS in Slice Segment Header", JCTVC-N0154, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, pp. 1-3.
Lu et al., "AHG9: Inter-Layer RPS Prediction", JCTVC-M0140, Joint Collaborative Team on Video Coding (JCT-VC) of ITU-T SG 16 WP 3 and ISO/IEC JTC 1/SC 29/WG 11, 13th Meeting, Incheon, KR, Apr. 18-26, 2013, pp. 1-9.
Rusert, Thomas, "AHG9: Inter-Layer SPS Prediction for HEVC Extensions", JCTVC-M0134, Joint Collaborative Team on Video Coding (JCT-VC) of ITU-T SG 16 WP 3 and ISO/IEC JTC 1/SC 29/WG 11, 13 Meeting, Incheon, KR, Apr. 18-26, 2013, pp. 1-7.
Tech et al., "MV-HEVC Draft Text 4", JCT3V-D1004, Joint Collaborative Team on 3D Video Coding Extension Development of ITU-T SG 16 WP 3 and ISO/IEC JTC 1/SC 29/WG 11, 4th Meeting, Incheon, KR, Apr. 20-26, 2013, 51 pages.
Wang et al., "AHG9: On VPS and SPS in HEVC 3DV and Scalable Extensions", JCTVC-M0268, Joint Collaborative Team on Video Coding (JCT-VC) of ITU-T SG 16 WP 3 and ISO/IEC JTC 1/SC 29/WG 11, 13 Meeting, Incheon, KR, Apr. 18-26, 2013, pp. 1-22.
Wang et al., "MV-HEVC/SHVC HLS: On Signalling and Derivation of Inter-Layer RPS(Combining Aspects of JCTVC-M0046 and JCTVC-M0269) ", JCTVC-M0458, Joint Collaborative Team on Video Coding (JCT-VC) of ITU-T SG 16 WP 3 and ISO/IEC JTC 1/SC 29/WG 11, 13th Meeting, Incheon, KR, Apr. 18-26, 2013, pp. 1-5.
Xu et al., "MV-HEVC/SHVC HLS: On Inter-Layer Prediction Related Syntax", JCTVC-N0081, Joint Collaborative Team on Video Coding (JCT-VC) of ITU-T SG 16 WP 3 and ISO/IEC JTC 1/SC 29/WG 11, 14th Meeting, Vienna, AT, Jul. 25-Aug. 2, 2013, pp. 1-8.
Boyce et al., "High Level Syntax Hooks for Future Extensions", Vidyo, Qualcomm, JCTVC-H0388, 8th Meeting: San José, CA, USA, Feb. 1-10, 2012.
Bross et al., "High Efficiency Video Coding (HEVC) Text Specification Draft 10 (for FDIS & Consent)", JCTVC-L1003_v11, 12th Meeting: Geneva, CH, Jan. 14-23, 2013, 332 pages.
Bross et al., "High Efficiency Video Coding (HEVC) Text Specification Draft 7", JCTVC-I1003, 9th Meeting: Geneva, CH, Apr. 27-May 7, 2012, 280 pages.
Bross et al., "High Efficiency Video Coding (HEVC) Text Specification Draft 10 (for FDIS & Consent)", JCTVC-L1003_v34, 12th Meeting: Geneva, CH, Jan. 14-23, 2013, 310 pages.
Chen et al., "Description of HEVC Scalable Extension Core Experiment SCE3: Inter-Layer Filtering", JCTVC-M1103, 13th Meeting: Incheon, KR, Apr. 18-26, 2013, 8 pages.
Elena et al., "HEVC Scalable Extensions Core Experiment SCE1: Support for Additional Resampling Phase Shifts", JCTVC-M1101, 13th Meeting: Incheon, KR, Apr. 18-26, 2013, 14 pages.
Guo et al., "Signaling of Phase Offset in Up-sampling Process and Chroma Sampling Location", Qualcomm Incorporated, InterDigital Communications, Inc., Nokia, JCTVC-M0465, Apr. 18-26, 2013, 8 pages.
Hannuksela et al., "Common Specification Text for Scalable and Multi-View Extensions (Revision of JCTVC-L0188 Straw-Man Text)", Nokia Corporation, Qualcomm Incorporated, InterDigital Communications, LLC, Vidyo, JCTVC-L0452, 12th Meeting: Geneva, CH, Jan. 17-23, 2013, 2 pages.
ISO/IEC, "3D Video Standardization Plans", Video Subgroup, ISO/IEC JTC1/SC29/WG11 N12557, San Jose, US, Feb. 2012, 3 pages.
ISO/IEC, "Information Technology-Coding of Audio-Visual Objects-Part 2: Visual", Reference No. ISO/IEC 14496-2:2001(E), Dec. 1, 2001, 536 pages.
ISO/IEC, "Information Technology—Coding of Moving Pictures and Associated Audio for Digital Storage Media at up to about 1,5 Mbit/s—Part 2: Video", Ref. No. ISO/IEC 11172-2:1993/Cor. 3:2003(E), Nov. 1, 2003, 6 pages.

(56) References Cited

OTHER PUBLICATIONS

ISO/IEC, "Information Technology—Generic Coding of Moving Pictures and Associated Audio Information: Video", Reference No. ISO/IEC 13818-2:2000 (E), Dec. 15, 2000, 220 pages.

ISO/IEC, "Joint Call for Proposals on Scalable Video Coding Extensions of High Efficiency Video Coding (HEVC)", ISO/IEC JTC1/SC29/WG11 N12957, Stockholm, Sweden, Jul. 2012, 11 pages.

ITU, "Series H: Audiovisual and Multimedia Systems Coding of Moving Video—Codec for Audiovisual Services AT n ×384 kbit/s", Reedition of CCITT Recommendation H.261 Published in the Blue Book, Fascicle III.6, Nov. 1988, 14 pages.

ITU-T, "Advanced Video Coding for Generic Audiovisual Services", ITU-T Recommendation H.264, Nov. 2007, 564 pages.

ITU-T, "New Video Codec to Ease Pressure on Global Networks", Available at http://www.itu.int/net/pressoffice/press_releases/2013/01.aspx#V4R_fq7vNQI, Jan. 25, 2013, 1 pages.

ITU-T, "Video coding for Low Bit Rate Communication", ITU-T Recommendation H.263, Jan. 2005, 226 pages.

Kim et al., "HM7: High Efficiency Video Coding (HEVC) Test Model 7 Encoder Description", JCTVC-I1002, 9th Meeting: Geneva, CH, Apr. 27-May 7, 2012, 42 pages.

Liu et al., "AHG9: On Scaling List Signalling for SHVC", MediaTek Inc. and Sony Corp., JCTVC-M0211, 13th Meeting: Incheon, South Korea, Apr. 18-26, 2013, 4 pages.

Luthra et al., "Requirements of the Scalable Enhancement of HEVC", WG11 Requirements and Video, ISO/IEC JTC1/SC29/WG11 N12956, Stockholm, Sweden, Jul. 2012, 12 pages.

Luthra et al., "Use Cases of the Scalable Enhancement of HEVC", WG11 Requirements and Video, ISO/IEC JTC1/SC29/WG11 N12782, Geneva, Switzerland, May 2012, 8 pages.

Ohm et al., "Work Plan in 3D Standards Development", JCT3V-B1006, 2nd Meeting: Shanghai, CN, Oct. 13-19, 2012, 5 pages.

Ohm, Jens-Rainer, "Advances in Scalable Video Coding", Proceedings of IEEE, vol. 93, No. 1, Jan. 2005, pp. 42-56.

Pu et al., "Non-SCE4: Switchable Filter on Integer Position", Qualcomm Incorporated, Samsung Electronics, Ltd., JCTVC-M0273, 13th Meeting: Incheon, KR, Apr. 18-26, 2013, 5 pages.

Sjoberg et al., "Overview of HEVC High-Level Syntax and Reference Picture Management", IEEE Transactions on Circuits and Systems for Video Technology, vol. 22, No. 12, Dec. 12, 2012, pp. 1858-1870.

Wang et al., "AHG12: Video Parameter Set and its Use in 3D-HEVC", Qualcomm Incorporated, JCTVC-10571, 9th Meeting: Geneva, CH, Apr. 27-May 7, 2012, 10 pages.

Wang, Ye-Kui, "Report of the Joint BoG on High-Level Syntax", JCTVC-M0450_v1, 13th Meeting: Incheon, KR, Apr. 18-26, 2013, 12 pages.

\* cited by examiner

| inter-layer/view_parameter_set_rbsp( ) { | Descriptor |
|---|---|
|   ips_video_parameter_set_id | u(4) |
|   ips_inter_layer_view_ parameter_set_id | u(4) |
|   for( i = 0; i < vps_max_layers_minus1; i++ ) | |
|     max_sublayer_for_ilp_plus1[i] | u(3) |
|   direct_dep_type_len_minus2 | ue(v) |
|   for( i = 1; i <= vps_max_layers_minus1; i++ ) | |
|     for( j = 0; j < i; j++ ) | |
|       if( direct_dependency_flag[ i ][ j ] ) | |
|         direct_dependency_type[ i ][ j ] | u(v) |
|   num_video_format_subsets | ue(v) |
|   for ( idx = 0; idx < num_video_format_subsets; idx++ ) | |
|     ips_video_format_subset(idx) | |
|   num_coding_param_subsets | ue(v) |
|   for ( idx = 0; idx < num_coding_param_subsets; idx++) | |
|     ips_coding_param_subset(idx) | |
|   num_pcm_param_subsets | ue(v) |
|   for ( i = 0; i < num_pcm_param_subsets; idx ++) | |
|     ips_pcm_param_subset(idx) | |
|   num_scaling_list_subsets | ue(v) |
|   for ( idx = 0; idx < num_scaling_list_subsets; idx ++) | |
|     ips_scaling_list_subset(idx) | |
|   num_short_term_ref_pic_sets | ue(v) |
|   for( i = 0; i < num_short_term_ref_pic_sets; i++) | |
|     short_term_ref_pic_set( i ) | |
|   long_term_ref_pics_present_flag | u(1) |
|   if( long_term_ref_pics_present_flag ) { | |
|     num_long_term_ref_pics_sps | ue(v) |
|     for( i = 0; i < num_long_term_ref_pics_sps; i++ ) { | |
|       lt_ref_pic_poc_lsb_sps[ i ] | u(v) |
|       used_by_curr_pic_lt_sps_flag[ i ] | u(1) |
|     } | |
|   } | |
|   num_scaled_ref_layer_offset_subsets | ue(v) |
|   for (idx = 0; idx < num_scaled_ref_layer_suboffset_sets; idx ++) | |
|     ips_scaled_ref_layer_offset_subset(idx) | |
|   num_vui_param_subsets | ue(v) |
|   for (i = 0; i < num_vui_param_subsets; i++) | |
|     ips_vui_param_subset(idx) | |
|   rbsp_trailing_bits( ) | |
| } | |

FIG. 1A

| ips_video_format_subset( idx ) { | Descriptor |
|---|---|
| chroma_format_idc | ue(v) |
| if( chroma_format_idc == 3 ) | |
| separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| bit_depth_luma_minus8 | ue(v) |
| bit_depth_chroma_minus8 | ue(v) |
| } | |

| ips_coding_param_subset( idx ) { | Descriptor |
|---|---|
| log2_max_pic_order_cnt_lsb_minus4 | ue(v) |
| sps_sub_layer_ordering_info_present_flag | u(1) |
| for( i = ( sps_sub_layer_ordering_info_present_flag ? 0 : sps_max_sub_layers_minus1 );<br>    i <= sps_max_sub_layers_minus1; i++ ) { | |
| sps_max_dec_pic_buffering_minus1[i] | ue(v) |
| sps_max_num_reorder_pics[i] | ue(v) |
| sps_max_latency_increase_plus1 [ i ] | ue(v) |
| } | |
| log2_min_luma_coding_block_size_minus3 | ue(v) |
| log2_diff_max_min_luma_coding_block_size | ue(v) |
| log2_min_transform_block_size_minus2 | ue(v) |
| log2_diff_max_min_transform_block_size | ue(v) |
| max_transform_hierarchy_depth_inter | ue(v) |
| max_transform_hierarchy_depth_intra | ue(v) |
| } | |

FIG. 1B

| ips_pcm_param_subset( idx ) { | Descriptor |
|---|---|
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |
|     log2_diff_max_min_pcm_luma_coding_block_size | ue(v) |
|     pcm_loop_filter_disabled_flag | u(1) |
| } | |

| ips_scaling_list_subset( idx ) { | Descriptor |
|---|---|
|     scaling_list_enabled_flag | u(1) |
|     if( scaling_list_enabled_flag ) { | |
|         sps_scaling_list_data_present_flag | u(1) |
|         if( sps_scaling_list_data_present_flag ) | |
|             scaling_list_data(idx ) | |
| } | |

| ips_scaled_ref_layer_offset_subset( idx ) { | Descriptor |
|---|---|
|     scaled_ref_layer_offset_present_flag | |
|     if (scaled_ref_layer_offset_present_flag{ | |
|         scaled_ref_layer_left_offset | se(v) |
|         scaled_ref_layer_top_offset | se(v) |
|         scaled_ref_layer_right_offset | se(v) |
|         scaled_ref_layer_bottom_offset | se(v) |
|     } | |
| } | |

| ips_vui_param_subset( idx ) { | Descriptor |
|---|---|
|     vui_parameters_present_flag | |
|     if (vui_parameters_present_flag) | |
|         vui_parameters() | |
| } | |

FIG. 1C

| seq_parameter_set_rbsp( ) { | Descriptor |
|---|---|
|   sps_video_parameter_set_id | u(4) |
|   *if (nuh_layer_id > 0)* | |
|     *sps_inter_layer_view_parameter_set_id* | u(4) |
|   if( nuh_layer_id == 0 ) { | |
|     sps_max_sub_layers_minus1 | u(3) |
|     sps_temporal_id_nesting_flag | u(1) |
|     profile_tier_level( 1, sps_max_sub_layers_minus1 ) | |
|   } | |
|   sps_seq_parameter_set_id | ue(v) |
|   if (nuh_layer_id == 0) { | |
|     chroma_format_idc | ue(v) |
|     if( chroma_format_idc == 3 ) | |
|       separate_colour_plane_flag | u(1) |
|     pic_width_in_luma_samples | ue(v) |
|     pic_height_in_luma_samples | ue(v) |
|     conformance_window_flag | u(1) |
|     if( conformance_window_flag ) { | |
|       conf_win_left_offset | ue(v) |
|       conf_win_right_offset | ue(v) |
|       conf_win_top_offset | ue(v) |
|       conf_win_bottom_offset | ue(v) |
|     } | |
|     bit_depth_luma_minus8 | ue(v) |
|     bit_depth_chroma_minus8 | ue(v) |
|     log2_max_pic_order_cnt_lsb_minus4 | ue(v) |
|     sps_sub_layer_ordering_info_present_flag | u(1) |
|     for( i = ( sps_sub_layer_ordering_info_present_flag ? 0 : sps_max_sub_layers_minus1 );<br>        i <= sps_max_sub_layers_minus1; i++ ) { | |
|       sps_max_dec_pic_buffering_minus1[ i ] | ue(v) |
|       sps_max_num_reorder_pics[ i ] | ue(v) |
|       sps_max_latency_increase_plus1[ i ] | ue(v) |
|     } | |
|     log2_min_luma_coding_block_size_minus3 | ue(v) |
|     log2_diff_max_min_luma_coding_block_size | ue(v) |
|     log2_min_transform_block_size_minus2 | ue(v) |
|     log2_diff_max_min_transform_block_size | ue(v) |
|     max_transform_hierarchy_depth_inter | ue(v) |
|     max_transform_hierarchy_depth_intra | ue(v) |
|     scaling_list_enabled_flag | u(1) |
|     if( scaling_list_enabled_flag ) { | |

FIG. 2A

| | |
|---|---|
| sps_scaling_list_data_present_flag | u(1) |
| if( sps_scaling_list_data_present_flag ) | |
| scaling_list_data( ) | |
| } | |
| amp_enabled_flag | u(1) |
| sample_adaptive_offset_enabled_flag | u(1) |
| pcm_enabled_flag | u(1) |
| if( pcm_enabled_flag ) { | |
| pcm_sample_bit_depth_luma_minus1 | u(4) |
| pcm_sample_bit_depth_chroma_minus1 | u(4) |
| log2_min_pcm_luma_coding_block_size_minus3 | ue(v) |
| log2_diff_max_min_pcm_luma_coding_block_size | ue(v) |
| pcm_loop_filter_disabled_flag | u(1) |
| } | |
| num_short_term_ref_pic_sets | ue(v) |
| for( i = 0; i < num_short_term_ref_pic_sets; i++) | |
| short_term_ref_pic_set( i ) | |
| long_term_ref_pics_present_flag | u(1) |
| if( long_term_ref_pics_present_flag ) { | |
| num_long_term_ref_pics_sps | ue(v) |
| for( i = 0; i < num_long_term_ref_pics_sps; i++ ) { | |
| lt_ref_pic_poc_lsb_sps[ i ] | u(v) |
| used_by_curr_pic_lt_sps_flag[ i ] | u(1) |
| } | |
| } | |
| sps_temporal_mvp_enabled_flag | u(1) |
| strong_intra_smoothing_enabled_flag | u(1) |
| vui_parameters_present_flag | u(1) |
| if( vui_parameters_present_flag ) | |
| vui_parameters( ) | |
| } | |
| else { | |
| *ips_video_format_subsets_index* | ue(v) |
| *ips_coding_param_subsets_index* | ue(v) |
| *ips_scaling_list_subsets_index* | ue(v) |
| amp_enabled_flag | u(1) |
| sample_adaptive_offset_enabled_flag | u(1) |
| pcm_enabled_flag | u(1) |
| if( pcm_enabled_flag ) | |
| *ips_pcm_param_subsets_index* | ue(v) |
| sps_temporal_mvp_enabled_flag | u(1) |

FIG. 2B

| | |
|---|---|
| strong_intra_smoothing_enabled_flag | u(1) |
| *ips_vui_param_subsets_index* | ue(v) |
| } | |
| sps_extension_flag | u(1) |
| if( sps_extension_flag ) { | |
| sps_extension( ) | |
| sps_extension2_flag | u(1) |
| if( sps_extension2_flag ) | |
| while( more_rbsp_data( ) ) | |
| sps_extension_data_flag | u(1) |
| } | |
| rbsp_trailing_bits( ) | |
| } | |

FIG. 2C

| sps_extension( ) { | Descriptor |
|---|---|
| inter_view_mv_vert_constraint_flag | u(1) |
| *ips_scaled_ref_layer_offset_subsets_index* | ue(v) |
| } | |

FIG. 3

INTER-LAYER PARAMETER SET FOR HEVC EXTENSIONS

CROSS REFERENCE TO RELATED APPLICATIONS

This application is the National Stage Entry under 35 U.S.C. § 371 of Patent Cooperation Treaty Application No. PCT/US2014/042923, filed Jun. 18, 2014, which claims the benefit of U.S. Provisional Patent Application Nos. 61/836,552 filed on Jun. 18, 2013, 61/837,116 filed on Jun. 19, 2013, 61/840,380 filed on Jun. 27, 2013, and 61/860,221 filed on Jul. 30, 2013, the contents of which are hereby incorporated by reference herein.

BACKGROUND

Digital video compression technologies, for example high efficiency video coding (HEVC) that enhances the efficiency of digital video communication, distribution and/or consumption continue to be developed. In comparison with the traditional digital video services (such as TV signals), video applications may be deployed in heterogeneous environments. Such heterogeneity may exist on the client side as well as the network side. Scalable video coding mechanisms may be used to encode a video signal once at the highest resolution, but may enable decoding from subsets of the streams depending on the specific rate and resolution required by certain applications and/or supported by the client device.

Video compression technologies may be provided that may include scalable video coding techniques to improve the experience of an end user and/or quality of service. For example, the scalable video coding may be implemented with high level syntax designs via one or more parameter sets. However, the parameter sets and the syntax elements that may be signaled may inefficiently consume valuable communication bandwidth and/or processing resources.

SUMMARY

Systems, methods, and instrumentalities are provided to implement video data processing. A video coding device may receive a plurality of video representation format subsets. The video coding device may receive a count of the plurality of video representation format subsets. The plurality of video representation format subsets may correspond to a plurality of layers. For example, a first video representation format subset of the plurality of video representation format subsets may correspond to a first layer and a second video representation format subset of the plurality of video representation format subsets may correspond to a second layer, or to multiple layers.

Each of the plurality of video representation subsets may include one or more video representation parameter values. The parameter values may include at least one of an indication of picture width in luma samples, an indication of picture height in luma samples, an indication of bit depth of one or more samples of a luma array, an indication of bit depth of one or more samples of a chroma array, or an indication of a chroma format index.

The video coding device may receive a video representation format subset index associated with a current layer. For example, the video representation format subset index may be received in a cross-layer parameter set and/or a sequence parameter set (SPS).

The video coding device may determine, using the video representation format subset index, one of the plurality of video representation format subsets associated with the current layer.

A video encoding device may compare a number of active reference layers with a number of direct reference layers. The video encoding device may determine whether to include an indication of the active reference layers in a slice-level header based on the comparing of the number of active reference layers with the number of direct reference layers.

The video encoding device may include the indication of a picture that may be used for inter-layer prediction, e.g., if that the number of active reference layers is not equal to the number of direct reference layers. The video encoding device may skip the indication of a picture that may be used for inter-layer prediction, e.g., if the number of active reference layers is equal to the number of direct reference layers.

A video decoding device may receive a bitstream comprising one or more layers. On a condition that the number of active reference layers in the received bitstream is not equal to the number of direct reference layers, the video decoding device may receive an inter-layer prediction layer syntax element. The inter-layer prediction layer syntax element indicates a list of reference picture layer IDs that may be used by a current picture of a current layer for inter-layer prediction.

The video decoding device may derive the inter-layer prediction layer syntax element, e.g., if the number of active reference layers is equal to the number of direct reference layers. The inter-layer prediction layer syntax element may be inferred from a layer ID of a direct reference layer of the current layer.

BRIEF DESCRIPTION OF THE DRAWINGS

FIGS. 1A-1C are syntax tables that illustrate an example inter-layer parameter set.

FIGS. 2A-2C are syntax tables that illustrate an example of a simplified sequence parameter set.

FIG. 3 is a syntax table that illustrates an example of a simplified sequence parameter set extension.

DETAILED DESCRIPTION

Figure 4:
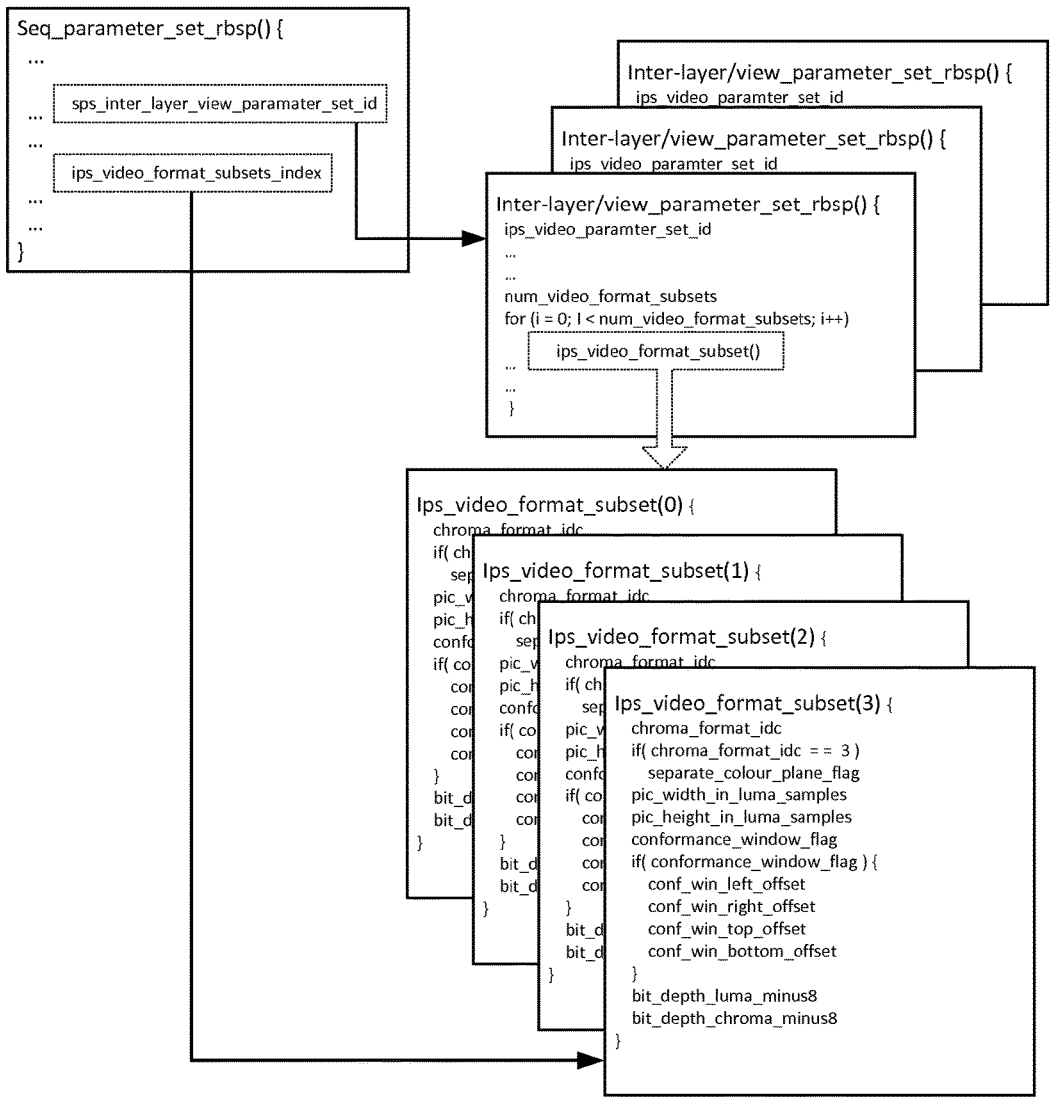
FIG. 4 illustrates an example process of deriving video coding and/or decoding parameters from an inter-layer parameter set.

A detailed description of illustrative embodiments will now be described with reference to the various figures.

Although this description provides a detailed example of possible implementations, it should be noted that the details are intended to be exemplary and in no way limit the scope of the application.

In a video coding system, on a client device side, the N-screen scenario, that is, consuming video content on devices with varying screen sizes and/or display capabilities, for example smart phones, tablets, PCs, HDTVs, and the like, is expected to continue. On the communications network side, video may be transmitted across one or more of the Internet, WiFi networks, mobile communications networks (e.g., 3G, 4G, etc.), and the like, or any combination thereof.

To improve the user experience (e.g., for an end user of a client device) and/or video quality of service, scalable video coding may be implemented. With scalable video coding, a video signal may be encoded once at a highest resolution. Such a video signal may be decoded from one or more subsets of one or more video streams associated with the video signal, for example in accordance with a specific rate and/or resolution that may be required by a particular application and/or that may be supported by a client device. A resolution may include one or more video parameters, such as spatial resolution (e.g., picture size), temporal resolution (e.g., frame rate), and video quality (e.g., subjective quality such as MOS and/or objective quality such as PSNR, SSIM, or VQM). Other video parameters that may be used include chroma format (e.g., YUV420, YUV422, or YUV444), bit-depth (e.g., 8-bit or 10-bit video), complexity, view, gamut (e.g. color gamut), and/or aspect ratio (e.g., 16:9 or 4:3).

Video standards may include tools and/or profiles that may support scalability modes. For example, high efficiency video coding may be configured to support scalable video coding. An example scalable extension to HEVC may support one or more of spatial scalability (e.g., a scalable bitstream may include respective signals at more than one spatial resolution), quality scalability (e.g., a scalable bitstream may include respective signals at more than one quality level), and standard scalability (e.g., a scalable bitstream may include a base layer coded using H.264/AVC and one or more enhancement layers coded using HEVC). Scalable video may be extended to 3D video. For example, multi-view scalability may be implemented (e.g., a scalable bitstream may include both 2D and 3D video signals). It should be appreciated that while aspects of scalable HEVC design may include the use of spatial and/or quality scalability, for example as described herein, that the techniques described herein may be applied to one or more other types of scalability.

Scalable extensions of HEVC (SHVC) may be implemented in accordance with a reference index based framework. A reference index based framework may keep operations at block level and/or below block level intact, such that single layer codec logics may be reused within a scalable coding system that employs such a framework. A reference index based framework may simplify the design of a scalable codec. Such a framework may support different types of scalabilities, for example by incorporating high level syntax signaling and/or inter-layer processing modules to achieve coding efficiency. High level syntax changes may be implemented to support inter-layer processing and/or multi-layer signaling of SHVC, for example. Such syntax changes may be implemented in accordance with a reference index based framework, for example.

Scalable video coding may support one or more layers (e.g., multiple layers). Each such layer may be designed to enable one or more of spatial scalability, temporal scalability, SNR scalability, or other types of scalability. A scalable bit stream, for example, may include mixed scalability layers, and one or more respective enhancement layers may depend on one or more lower layers in order to be decoded. An inter-layer process may generate an inter-layer reference picture (ILR) sample and/or motion field information, for example to enhance the prediction accuracy of one or more enhancement layers.

Several parameter sets may be specified for an HEVC implementation and/or for one or more corresponding extensions. For example, a video parameter set (VPS) may include one or more syntax elements that may be shared by multiple layers. A VPS may include information used for bitstream extraction, capability exchange, and/or session negotiation (e.g., maximum number of layers and/or one or more of profile, tier, and level information).

A sequence parameter set (SPS) may include information that may be common to one or more coded slices (e.g., all coded slices) in a coded video sequence, such as a series of video pictures spanning an interval of time. Such information may include one or more of picture resolution, bit depth, coding block size, and the like.

A picture parameter set (PPS) may include picture level information. Such information may include one or more of an initial quantization value, coding tools enable and/or disable flags, and the like. Information carried in the PPS may remain unchanged through a relatively long duration, for example a duration of multiple pictures, such that the information may not be updated frequently. Information that may be changed on the slice level may be included in a slice header.

One or more parameter sets, such as an VPS, an SPS and/or an PPS may be transmitted out-of-band (e.g., using a reliable channel, as in some application scenarios). A high level syntax design may allow multiple layers to refer to a single SPS (e.g., the same SPS). This may be used for multi-view and/or SNR scalability, for example. For spatial scalability, one or more layers (e.g., each layer) may refer to respective different SPSs, for example due to different video resolutions. If one or more parameters in an SPS (e.g., a majority of the parameters) are identical across multiple layers, it may be desirable to save bitrate by removing such redundancy. One or more such parameters may be shared among the multiple layers.

In an example approach to save bitrate, SPS to SPS prediction may be implemented, which may be used to predict one or more enhancement layer SPS parameters, such as a scaling list, a reference picture set (RPS), etc., for example from the SPS parameters of a base layer and/or another dependent layer. Such SPS to SPS prediction may introduce parameter set dependency among different layers.

In another example to save bitrate, VPS to SPS prediction may be implemented, which may relocate one or more shared parameters across layers to the VPS, and may predict one or more shared SPS parameters (e.g., SPS parameters of each layer) based on corresponding parameters in the VPS.

Design criteria for VPS and/or SPS implementations for HEVC extensions may include one or more of the following. The VPS may include one or more parameters that may be useful for bitstream extraction and/or capability exchange. Decoded picture buffer (DPB) related parameters may be included in a VPS extension.

A parameter set (e.g., an inter-layer parameter set (IPS)) may be implemented that may aggregate one or more high level syntax elements that may be shared among multiple layers. One or more layers (e.g., each layer) may refer to one or more IPS parameters, which may save corresponding overhead bits.

An IPS may be provided in a scalable HEVC video coding system. For example, because IPS may not be carried in the base layer, the size of the IPS may not impact the base layer sub-stream. IPS may provide high level signaling efficiency, for example by facilitating the prediction of one or more shared parameters across multiple layers. An implementation of an IPS may remove parsing dependency in a video coding system, for example because one or more parameters that may typically be placed in different parameter sets may be included in the same IPS, such that the parsing of each parameter may not rely on a parsing result from another different parameter set.

IPS may be applicable to one or more enhancement layers in a scalable coding system, such that the nuh_layer_id value of an IPS NAL unit may not be zero (0) for a conforming bitstream. For example, a conforming bitstream may have the nuh_layer_id of one or more IPS NAL units (e.g., all IPS NAL units) equal to one (1).

FIGS. 1A-1C are syntax tables that illustrate an example IPS. As illustrated in FIGS. 1A-1C, an IPS may include one or more parameters and may be designed for the purpose of coding multiple layers. Such parameters may include, for example, max_sublayer_for_ilp_plus1 and direct_dependency_type. Because one or more layers may share the same or very similar RPSs, the IPS may include RPSs related to the one or more layers.

One or more parameters that may serve a similar purpose or similar purposes, and that may be present in the SPS, may be grouped into respective subsets that may include one or more of a video format subset, a coding parameter subset, a scaling list subset, a scaled offset subset, or a VUI subset. In an IPS, one or more subsets (e.g., each subset) may have respective pluralities of parameter values. This may allow an enhancement layer to refer to a plurality of parameter values by indexing into the IPS and a subset. For example, a first video format set (e.g., 0) may specify 720p format and a second video format set (e.g., 1) may specify 1080p format. For a mixed spatial and/or SNR scalability coding system with four (4) layers (e.g., where layer-0 is a 720p layer and layers 1, 2, and 3 are 1080p layers), a base layer (e.g., layer-0) SPS may refer to ips_video_format_subset(0), while enhancement layers (e.g., layers 1, 2, and 3) may refer to ips_video_format_subset(1). In such an example, a reduced (e.g., minimal) number of syntax elements may be signaled to cover parameters used by multiple layers.

The following may apply to entries in the example IPS syntax tables shown in FIGS. 1A-1C. The syntax element ips_inter_layer_view_parameter_set_id may identify the IPS for reference by other syntax elements. The syntax element num_video_format_subsets may specify the number of video format syntax structures (ips_video_format_subset). The syntax element num_coding_param_subsets may specify the number of coding parameter syntax structure (ips_coding_param_subset). The syntax element num_pcm_param_subsets may specify the number of PCM coding parameter syntax structure (ips_pcm_param_subset). The syntax element num_scaling_list_subsets may specify the number of scaling list structure (ips_scaling_list_subset). The syntax element num_scaled_ref_layer_offset_subset may specify the number of scaled reference layer offset structures (ips_scaled_ref_layer_offset_subset). The syntax element num_vui_param_subsets may specify the VUI parameter structure (ips_vui_param_subset).

One or more video representation formats may be grouped into a subset. One or more subsets may be signaled in a parameter set (e.g., an IPS). The subsets may be referenced by one or more layers. For example a first layer may reference a first subset. One or more layers may reference a second subset. Each of the layers may refer to the index of the subsets to derive the video representation syntax values. One or more subsets, e.g., in an IPS, may be implemented to further save the bits signaling IPS syntax elements (e.g., overhead bits). For example, an absolute parameter value limited to the first set of parameter values of a given subset may be signaled. For one or more subsequent sets of parameter values, respective differential values between a current set of parameter values and a previous set of parameter values may be signaled. To illustrate, ips_video_format_subset(0) may indicate 720p format (pic_width_in_luma_samples may be set to 1280 and pic_height_in_luma_samples may be set to 720), and ips_video_format_set(1) may indicate 1080p format (pic_width_in_luma_samples may be set to 1920 and pic_height_in_luma_samples may be set to 1080). Rather than signaling both 1920 and 1080, respective differential values between ips_video_format_set(0) and ips_video_format_set(1) may be signaled. In accordance with the example, differential values of 640 and 360 for width and height, respectively, may be signaled in ips_video_format_set(1).

A corresponding syntax table of such an IPS may be as is illustrated in FIGS. 1A-1C, while the descriptor type may be changed to ue(v) or se(v), for example, for those parameters that may be signaled as differential values. The value of the relevant parameter may be derived as follows.

For example, if S(i) is the i-th set of parameters for a given subset, the variable P(i, X) is the parameter X in the i-th parameter set S(i), and/or the variable ParamValueInIPS(i, X) is the value signaled for P(i, X) in IPS. The variable ParamValue(i, X) of parameter X in the i-th parameter subset, P(i, X), may be derived from the parameter X in the (i−1)-th parameter subset, P(i−1, X), for example, as follows.

```
if ( i == 0 )
    ParamValue(i, X) = ParamValueInIPS(i, X)
else
    ParamValue(i, X) = ParamValue(i−1, X) + ParamValueInIPS(i, X)
```

The SPS and/or its extension may be simplified, for example as depicted in FIGS. 2A-2C and FIG. 3, respectively. Rather than carrying similar syntax elements in the SPS for one or more enhancement layers, the enhancement layer SPS syntax table may be simplified, for example by including reference to an IPS parameter set index.

One or more syntax elements of the SPS (e.g., all such syntax elements) may be kept intact for the base layer (nuh_layer_id=0), as represented by the shaded entries in FIGS. 2A-2C. This may allow for backward compatibility, for example with a single layer HEVC specification. Example syntax elements that may be added to the SPS in accordance with an implementation of an IPS are represented by italicized text in FIGS. 2A-2C and FIG. 3.

The following may apply to entries in the simplified SPS and extension syntax tables shown in FIGS. 2A-2C and FIG. 3. As illustrated in FIGS. 2A-2C and 3, the syntax element sps_inter_layer_view_parameter_set_id may specify the value of the ips_inter_layer_view_parameter_set_id of an active parameter set (e.g., an IPS). The syntax element ips_video_format_subsets_index signaled in a parameter set may specify the index, into the list of video representation format syntax structures included in the active parameter set. The syntax element ips_video_format_subsets_index may specify the representation format syntax structure that may apply to the layers that refer to this SPS. The range of ips_video_format_subsets_index may be from 0 to num_video_format_subsets_index, exclusive. The syntax element ips_coding_param_subsets_index may specify the index, into the list of coding parameter syntax structures included in the active IPS. The range of ips_coding_param_subsets_index may be from 0 to num_coding_param_subsets_index, exclusive. ips_scaling_list_subsets_index may specify the index, into the list of scaling list syntax structures included in the active IPS. The range of ips_scaling_list_subsets_index may be from 0 to num_scaling_list_subsets_index, exclusive. ips_pcm_param_subsets_index may specify the index, into the list of PCM parameter syntax structures included in the active IPS. The range of ips_pcm_param_subsets_index may be from 0 to num_pcm_param_subsets_index, exclusive. ips_vui_param_subsets_index may specify the index, into the list of VUI syntax structures included in the active IPS. The range of ips_vui_param_subsets_index may be from 0 to num_vui_param_subsets_index, exclusive. ips_scaled_ref_layer_offset_subset_index may specify the index, into the list of video format syntax structures included in the active IPS. The range of ips_scaled_ref_layer_offset_subsets_index may be from 0 to num_scaled_ref_layer_offset_subsets_index, exclusive.

These example syntax structure indexes may allow an enhancement layer to derive a plurality of parameter values, for example by indexing into an IPS and a particular subset. For example, to derive the pic_width_in_luma_samples of a layer (e.g., an enhancement layer (EL)), the EL may locate the associated active IPS by the IPS identification (sps_inter_layer_view_parameter_set_id), e.g., present in the given EL's SPS. Using the value of the index ips_video_format_subsets_index in the EL SPS, the EL may locate the particular video format subset present in the associated active IPS, ips_video_format_subset(ips_video_format_subsets_index). The value of pic_width_in_luma_samples of EL may be derived from the corresponding parameter value of pic_width_in_luma_samples present in ips_video_format_subset (ips_video_format_subsets_index), for example directly in accordance with the first example IPS signaling method described herein. Alternatively, the value of pic_width_in_luma_samples may be derived from the ParamValue (ips_video_format_subsets_index, pic_width_in_luma_samples), for example in accordance the second example IPS signaling method described herein. The value of pic_height_in_luma_samples of this EL may be derived in a similar manner. FIG. 4 illustrates such an example to derive the parameters from IPS. Values of one or more other parameters in one or more other parameter subsets may be derived in a similar manner.

An IPS raw byte sequence payload (RBSP) may include one or more parameters that may be referred to by one or more SPS RBSPs. Each IPS RBSP may initially be considered not active, for example at the start of operation of a decoding process. During operation of an example decoding process, at most one IPS RBSP may be considered active. The activation of any IPS RBSP may result in the deactivation of a previously-active IPS RBSP.

When an IPS RBSP is not already active and it is referred to by activation of an SPS RBSP (e.g., in which sps_inter_layer_view_parameter_set_id is equal to the ips_inter_layer_view_parameter_set_id value), the IPS RBSP may be activated. The activated IPS RBSP may be called the active IPS RBSP until it is deactivated, for example, as a result of the activation of another IPS RBSP. An IPS RBSP, with that particular value of ips_inter_layer_view_parameter_subset_id, may be available to the decoding process prior to its activation.

A slice header may include information that may change from one slice to other, and picture related information that may be small or relevant for some of the slice and/or picture types. In a video coding standard, e.g., scalable extensions of high efficiency video coding (HEVC) (SHVC), the syntax elements designed for inter-layer prediction, may include sample prediction and motion prediction may have inherent redundancy. The bit cost of slice header may be reduced by removing certain redundancy, for example, through adjusting some signaling logics.

Table 1 illustrates an example of an VPS extension syntax table. Table 2 illustrates an example of slice header syntax used in a video coding standard, e.g., SHVC.

TABLE 1

| vps_extension( ) { | Descriptor |
|---|---|
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 0; i <= vps_max_layers_minus1; i++ ) { | |
|     if( yps_nuh_layer_id_present_flag && i > 0 ) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   for( i = 1; i <= vps_max_layers_minus1; i++ ) | |
|     for( j = 0; j < i; j++ ) | |
|       direct_dependency_flag[ i ][ j ] | u(1) |
|   for( i = 0; i < vps_max_layers_minus1; i++ ) | |
|     max_tid_il_ref_pics_plus1[ i ] | u(3) |

TABLE 1-continued

| vps_extension( ) { | Descriptor |
|---|---|
|   vps_number_layer_sets_minus1 | u(10) |
|   vps_num_profile_tier_level_minus1 | u(6) |
|   for( i = 1; i <= vps_num_profile_tier_level_minus1; i ++ ) { | |
|     vps_profile_present_flag[ i ] | u(1) |
|     if( !vps_profile_present_flag[ i ] ) | |
|       profile_ref_minus1[ i ] | u(6) |
|     profile_tier_level( vps_profile_present_flag[ i ], vps_max_sub_layers_minus1 ) | |
|   } | |
|   numOutputLayerSets = vps_number_layer_sets_minus1 + 1 | |
|   more_output_layer_sets_than_default_flag | u(1) |
|   if( more_output_layer_sets_than_default_flag ) { | |
|     num_add_output_layer_sets_minus1 | u(10) |
|     numOutputLayerSets += num_add_output_layer_sets_minus1 + 1 | |
|   } | |
|   if( numOutputLayerSets > 1 ) | |
|     default_one_target_output_layer_flag | u(1) |
|   for( i = 1; i < numOutputLayerSets; i++ ) { | |
|     if( i > vps_number_layer_sets_minus1 ) { | |
|       output_layer_set_idx_minus1[ i ] | u(v) |
|       lsIdx = output_layer_set_idx_minus1[ i ] + 1 | |
|       for( j = 0 ; j < NumLayersInIdList[ lsIdx ] − 1; j++) | |
|         output_layer_flag[ i ][ j ] | u(1) |
|     } | |
|     profile_level_tier_idx[ i ] | u(v) |
|   } | |
|   max_one_active_ref_layer_flag | u(1) |
|   direct_dep_type_len_minus2 | ue(v) |
|   for( i = 1; i <= vps_max_layers_minus1; i++ ) | |
|     for( j = 0; j < i; j++ ) | |
|       if( direct_dependency_flag[ i ][ j ] ) | |
|         direct_dependency_type[ i ][ j ] | u(v) |
|   single_layer_for_non_irap_flag | u(1) |
| } | |

TABLE 2

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     if( num_extra_slice_header_bits > 0 ) | |
|       discardable_flag | u(1) |
|     for( i = 1; i < num_extra_slice_header_bits ; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |

TABLE 2-continued

| slice_segment_header( ) { | Descriptor |
|---|---|
|     num_long_term_pics | ue(v) |
|     for( i = 0; i < num_long_term_sps + num_long_term_pics; i++ ) { | |
|       if( i < num_long_term_sps ) { | |
|         if( num_long_term_ref_pics_sps > 1 ) | |
|           lt_idx_sps[ i ] | u(v) |
|       } else { | |
|         poc_lsb_lt[ i ] | u(v) |
|         used_by_curr_pic_lt_flag[ i ] | u(1) |
|       } | |
|       delta_poc_msb_present_flag[ i ] | u(1) |
|       if( delta_poc_msb_present_flag[ i ] ) | |
|         delta_poc_msb_cycle_lt[ i ] | ue(v) |
|     } | |
|   } | |
|   if( sps_temporal_mvp_enabled_flag ) | |
|     slice_temporal_mvp_enabled_flag | u(1) |
| } | |
| if( nuh_layer_id > 0 && NumDirectRefLayers[ nuh_layer_id ] > 0) { | |
|   inter_layer_pred_enabled_flag | u(1) |
|   if( inter_layer_pred_enabled_flag && NumDirectRefLayers[ nuh_layer_id ] > 1) { | |
|     if( !max_one_active_ref_layer_flag ) | |
|       num_inter_layer_ref_pics_minus1 | u(v) |
|     for( i = 0; i < NumActiveRefLayerPics; i++ ) | |
|       inter_layer_pred_layer_idc[ i ] | u(v) |
|   } | |
| } | |
| if( NumSamplePredRefLayers[ nuh_layer_id ] > 0 && NumActiveRefLayerPics > 0 ) | |
|   inter_layer_sample_pred_only_flag | u(1) |
| if( sample_adaptive_offset_enabled_flag ) { | |
|   slice_sao_luma_flag | u(1) |
|   slice_sao_chroma_flag | u(1) |
| } | |
| if( slice_type == P || slice_type == B) { | |
|   num_ref_idx_active_override_flag | u(1) |
|   if( num_ref_idx_active_override_flag ) { | |
|     num_ref_idx_l0_active_minus1 | ue(v) |
|     if( slice_type == B ) | |
|       num_ref idx_l1_active_minus1 | ue(v) |
|   } | |
|   if( lists_modification_present_flag && NumPocTotalCurr > 1 ) | |
|     ref_pic_lists_modification( ) | |
|   if( slice_type == B ) | |
|     mvd_l1_zero_flag | u(1) |
|   if( cabac_init_present_flag ) | |
|     cabac_init_flag | u(1) |
|   if( slice_temporal_mvp_enabled_flag ) { | |
|     if( nuh_layer_id > 0 && NumActiveMotionPredRefLayers > 0 ) | |
|       alt_collocated_indication_flag | u(1) |
|     if( alt_collocated_indication_flag ) | |
|       if( NumActiveMotionPredRefLayers > 1 ) | |
|         collocated_ref_layer_idx | ue(v) |
|     else { | |
|       if( slice_type == B ) | |
|         collocated_from_l0_flag | u(1) |
|       if( ( collocated_from_l0_flag && num_ref_idx_l0_active_minus1 > 0 ) || | |
|         ( !collocated_from_l0_flag && num_ref_idx_l1_active_minus1 > 0) ) | |
|         collocated_ref_idx | ue(v) |
|     } | |
|   } | |
|   if( ( weighted_pred_flag && slice_type == P) || | |
|     ( weighted_bipred_flag && slice_type == B ) ) | |
|     pred_weight_table( ) | |
|   five_minus_max_num_merge_cand | ue(v) |
| } | |
| slice_qp_delta | se(v) |
| if( pps_slice_chroma_qp_offsets_present_flag ) { | |
|   slice_cb_qp_offset | se(v) |
|   slice_cr_qp_offset | se(v) |
| } | |
| if( deblocking_filter_override_enabled_flag ) | |
|   deblocking_filter_override_flag | u(1) |
| if( deblocking_filter_override_flag ) { | |
|   slice_deblocking_filter_disabled_flag | u(1) |
|   if( !slice_deblocking_filter_disabled_flag ) { | |

TABLE 2-continued

| slice_segment_header( ) { | Descriptor |
|---|---|
|         slice_beta_offset_div2 | se(v) |
|         slice_tc_offset_div2 | se(v) |
|       } | |
|     } | |
|     if( pps_loop_filter_across_slices_enabled_flag &&<br>      ( slice_sao_luma_flag \|\| slice_sao_chroma_flag \|\|<br>      !slice_deblocking_filter_disabled_flag ) )<br>      slice_loop_filter_across_slices_enabled_flag | u(1) |
| }  | |
| if( tiles_enabled_flag \|\| entropy_coding_sync_enabled_flag ) { | |
|     num_entry_point_offsets | ue(v) |
|     if( num_entry_point_offsets > 0 ) { | |
|       offset_len_minus1 | ue(v) |
|       for( i = 0; i < num_entry_point_offsets; i++ ) | |
|         entry_point_offset_minus1[ i ] | u(v) |
|     } | |
| } | |
| if( slice_segment_header_extension_present_flag ) { | |
|     slice_segment_header_extension_length | ue(v) |
|     for( i = 0; i < slice_segment_header_extension_length; i++) | |
|       slice_segment_header_extension_data_byte[ i ] | u(8) |
| } | |
| byte_alignment( ) | |
| } | |

As illustrated in Table 1, max_one_active_ref_layer_flag may be signaled in VPS extension to specify, e.g., if one or more pictures from one layer or more than one layers may be used for inter-layer prediction in the scalable system. This flag may be used to impose the restriction to allow inter-layer reference pictures from one layer in the scalable system. Such a restriction may be desirable when scalable profiles and/or levels are defined. Depending on the setting of max_one_active_ref_layer_flag, the syntax element num_inter_layer_ref_pics_minus1 in the slice header (e.g., as illustrated in Table 2) may or may not be signaled in the slice header. When max_one_active_ref_layer_flag is equal to 1, num_inter_layer_ref_pic_minus1 may be inferred to be 0 and therefore may not be signaled, and one reference layer's layer ID may be signaled in the slice header, otherwise (e.g., when max_one_active_ref_layer_flag is 0), num_inter_layer_ref_pic_minus1 may be signaled. The num_inter_layer_ref_pic_minus1 flag, in the slice header, may be followed by layer IDs of (num_inter_layer_ref_pics_minus1+1) layers.

The max_one_active_ref_layer_flag may be replaced by max_num_active_ref_layers_minus1 flag. The descriptor type of the max_num_active_ref_layers_minus1 flag may be ue(v) (e.g., as illustrated in Table 3). The syntax element may indicate the maximum reference layers that may be used in the decoding process to serve the purpose of capability exchange. The appropriate profile and/or level constraints may be defined. The syntax element may be more flexible than a 1-bit flag.

TABLE 3

| vps_extension( ) { | Descriptor |
|---|---|
|   while( !byte_aligned( ) ) | |
|     vps_extension_byte_alignment_reserved_one_bit | u(1) |
|   ... | |
|   max_num_active_ref_layers_minus1 | ue(v) |
|   ... | |
| } | |

When max_num_active_ref_layers_minus1 is equal to 0, num_inter_layer_ref_pics_minus1 may not be signaled (e.g., may be omitted) in the slice header. In case at most one reference layer is allowed for inter-layer prediction, the bit cost of such syntax element in VPS extension may be the same as the original max_one_active_ref_layer_flag (e.g., 1 bit). In such a case, a video decoding device may infer the inter-layer prediction layer syntax element. Table 4 illustrates an example of a slice segment header.

TABLE 4

| slice_segment_header( ) { | Descriptor |
|---|---|
| .... | |
|   if( nuh_layer_id > 0 && NumDirectRefLayers[<br>    nuh_layer_id ]> 0) { | |
|     inter_layer_pred_enabled_flag | u(1) |
|     if( inter_layer_pred_enabled_flag &&<br>NumDirectRefLayers[ nuh_layer_id ] > 1) { | |
|       if( max_num_active_ref_layers_minus1 != 0) | |
|         num_inter_layer_ref_pics_minus1 | u(v) |
|       if (NumActiveRefLayerPics !=<br>NumDirectRefLayers[ nuh_layer_id ] ) | |
|         for( i = 0; i < NumActiveRefLayerPics; i++ ) | |
|           inter_layer_pred_layer_idc[ i ] | u(v) |
|     } | |
|   } | |
| .... | |
| } | |

The variable NumActiveRefLayerPics may be derived based on max_num_active_ref_layers_minus1. For example, the variable may be derived as follows:

| Pseudo Code 1: |
|---|
| if( nuh_layer_id = = 0 \|\|<br>  NumDirectRefLayers[ nuh_layer_id ] = = 0<br>  \|\| !inter_layer_pred_enabled_flag )<br>  NumActiveRefLayerPics = 0<br>else if( max_num_active_ref_layers_minus1 == 0 \|\|<br>NumDirectRefLayers[ nuh_layer_id ] = = 1 )<br>  NumActiveRefLayerPics = 1<br>else<br>  NumActiveRefLayerPics = num_inter_layer_ref_pics_minus1 + 1 |

As illustrated in Table 4, inter_layer_pred_layer_idc may be signaled, e.g., when number of active reference layers (e.g., NumActiveRefLayerPics) is not the same as the number of direct reference layers (e.g., NumDirectRefLayers[num_layer_id]). inter_layer_pred_layer_idc may not be present in the bitstream, e.g., when number of active reference layers (e.g., NumActiveRefLayerPics) is the same as the number of direct reference layers (e.g., NumDirectRefLayers[num_layer_id]). For example, inter_layer_pred_layer_idc in a slice header may be redundant. In such a case the indication of a picture that be used for inter-layer prediction may be skipped. In such a case, inter_layer_pred_layer_idc may be derived or inferred from RefLayerId as illustrated in Pseudo Code 2. The value of the variable NumDirectRefLayers may be provided in a standard, e.g., SHVC.

Pseudo Code 2:

```
if (NumActiveRefLayerPics = NumDirectRefLayers[nuh_layer_id]
) {
    for( j = 0; j < nuh_layer_id; j++ ) {
        if( direct_dependency_flag[ nuh_layer_id ][ j ] ) {
            RefLayerId[nuh_layer_id][j] = layer_id_in_nuh[j]
            inter_layer_pred_layer_idc[j] =
            RefLayerId[nuh_layer_id][j]
        }
    }
}
```

If a slice is not a dependent slice, for error resilience considerations, slice header may be provided for each of the slices in a picture. Since a picture may include one or more slices and the slice header may be provided for each of the slices, the bit cost of slice header may be more of a concern than the bit cost of other parameter sets, e.g., an SPS (Sequence parameter set), an PPS (Picture parameter set), etc. These parameter sets may be provided less frequently than the slice header.

In a video coding standard, e.g., SHVC, the variables such as NumActiveRefLayerPics, inter_layer_pred_layer_idc and collocated_ref_layer_idx may be the same for each of the slices of a coded picture. Therefore, instead of the slice header, the syntax elements, e.g., inter_layer_pred_enable_flag, num_inter_layer_ref_pics_minus1, inter_layer_pred_layer_idc, inter_layer_sample_pred_only_flag, alt_collocated_indicate_flag and collocated_ref_layer_idx, in SPS extension, PPS, APS or IPS may be sent so that the same syntax may not be duplicated for each slices within a picture. Table 5 illustrates syntax elements that may be signaled in SPS extension.

TABLE 5

| | Descriptor |
|---|---|
| sps_extension( ) { | |
| ... | |
|   if( nuh_layer_id > 0 ) { | |
|     NumActiveRefLayerPics = 0 | |
|     inter_layer_pred_enabled_flag | u(1) |
|     if( inter_layer_pred_enabled_flag ) { | |
|       num_inter_layer_ref_pics_minus1 | u(v) |
|       NumActiveRefLayerPics = | |
|       num_inter_layer_ref_pics_minus1 + 1 | |
|       for( i = 0; i < NumActiveRefLayerPics; i++ ) | |
|         inter_layer_pred_layer_idc[ i ] | u(v) |
|     } | |
|     if(NumActiveRefLayerPics > 0 ) | |
|       inter_layer_sample_pred_only_flag | u(1) |
|     if( sps_temporal_mvp_enabled_flag ) { | |
|       if( nuh_layer_id > 0 ) | |
|         alt_collocated_indication_flag | u(1) |
|       if( alt_collocated_indication_flag ) | |
|         collocated_ref_layer_idx | ue(v) |
|     } | |
|   } | |
| ... | |
| } | |

The conditions that rely on the parameter value signaled in other parameter sets may be modified when relocating the syntax elements from slice header to the parameter set, e.g., to avoid parsing dependency among parameter sets. Table 5 illustrates an example of an SPS extension syntax table when the relevant syntax elements are relocated from slice header into SPS extension.

In some applications the inter layer prediction related signaling (e.g., inter_layer_pred_enabled_flag, inter_layer_sample_pred_only_flag, etc.) may be changed from slice to slice or from picture to picture. For such applications, sending the syntax elements in the slice header may incur undesired signaling overhead. The flags may be added in SPS extension (or PPS or IPS), e.g., to indicate whether or not the inter layer prediction related syntax elements may be present in the slice segment header. Table 6 illustrates an example of syntax elements that may be signaled in the SPS extension. Table 7 illustrates an example of the corresponding slice header.

TABLE 6

| | Descriptor |
|---|---|
| sps_extension( ) { | |
| ... | |
|   if( nuh_layer_id > 0 ) { | |
|     sample_prediction_slice_present_flag | u(1) |
|     motion_prediction_slice_present_flag | |
|   } | |
| ... | |
| } | |

TABLE 7

| | Descriptor |
|---|---|
| slice_segment_header( ) { | |
|   .... | |
|   if( nuh_layer_id > 0 && NumDirectRefLayers[ nuh_layer_id ] > 0 && | |
| sample_prediction_slice_present_flag ) { | |
|     inter_layer_pred_enabled_flag | u(1) |
|     if( inter_layer_pred_enabled_flag && | |
| NumDirectRefLayers[ nuh_layer_id ] > 1) { | |
|       if( !max_one_active_ref_layer_flag ) | |
|         num_inter_layer_ref_pics_minus1 | u(v) |
|       for( i = 0; i < NumActiveRefLayerPics; i++ ) | |

TABLE 7-continued

| | Descriptor |
|---|---|
|         inter_layer_pred_layer_idc[ i ] | u(v) |
|       } | |
|     } | |
|     if( NumSamplePredRefLayers[ nuh_layer_id ] > 0 && | |
| NumActiveRefLayerPics > 0 && sample_prediction_slice_present_flag) | |
|         inter_layer_sample_pred_only_flag | u(1) |
| .... | |
|     if( slice_temporal_mvp_enabled_flag && ((nuh_layer_id == 0) \|\| | |
| (nuh_layer_id > 0 && motion_prediction_slice_present_flag))) { | |
|         if( nuh_layer_id > 0 && NumActiveMotionPredRefLayers > 0 ) | |
|             alt_collocated_indication_flag | u(1) |
|         if( alt_collocated_indication_flag ) | |
|             if( NumActiveMotionPredRefLayers > 1 ) | |
|                 collocated_ref_layer_idx | ue(v) |
|         else { | |
|             if( slice_type = = B ) | |
|                 collocated_from_l0_flag | u(1) |
|             if( ( collocated_from_l0_flag && num_ref_idx_l0_active_minus1 | |
| > 0 ) \|\| | |
|               ( !collocated_from_l0_flag && | |
| num_ref_idx_l1_active_minus1 > 0 ) ) | |
|                 collocated_ref_idx | ue(v) |
|         } | |
|     } | |
| .... | |
| } | |

The sample_prediction_present_slice_present_flag equal to 1 may indicate that the inter layer sample prediction related syntax elements such as inter_layer_pred_enable_flag, num_inter_layer_ref_pics_minus1, inter_layer_pred_layer_idc, inter_layer_sample_pred_only_flag may be present in the slice header. The sample_prediction_present_slice_present_flag equal to 0 may indicate that the relative sample prediction syntax elements may not be present in the slice segment header. When not present, the values of the syntax elements may be inferred based on one or more variables. For example, Pseudo Code 3 provides an example of how the values of the syntax elements may be inferred.

Pseudo Code 3:

```
if ( sample_prediction_slice_present_flag == 0)) {
    inter_layer_pred_enabled_flag =
    NumSamplePredRefLayers[nuh_layer_id] ? 1 : 0
    if (inter_layer_pred_enable_flag) {
        num_inter_layer_ref_pics_minus1 =
        NumSamplePredRefLayers[nuh_layer_id] - 1
        for (i = 0; j = 0; i < nuh_layer_id; i++)
            if (SamplePredEnabledFlag[nuh_layer_id][i])
                inter_layer_pred_layer_idc[j++] = layer_id_in_nuh[i]
    }
}
```

The variables, NumSamplePredRefLayers, NumSamplePredLayers and SamplePredEnabledFlag may be provided in a video coding standard, e.g., SHVC. The sample prediction syntax element inter_layer_sample_pred_only may be inferred to be equal to 0 when sample_prediction_slice_present_flag is equal to 0. The motion_prediction_slice_present_flag equal to 1 may indicate that the inter layer motion prediction related syntax elements, e.g., alt_collocated_indication_flag, collocated_ref_layer_idx, etc. may be present in slice header. The motion_prediction_slice_present_flag equal to 0 may indicate that the inter layer motion prediction related syntax elements may not be present in the enhancement layer slice segment header. The value of these syntax elements may be inferred based on one or more variables. For example, Pseudo Code 4 provides an example of how the values of the syntax elements may be inferred. The NumMotionPredRefLayers and/or MotionPredRefLayerId may be provided by a video coding standard, e.g., SHVC.

Pseudo Code 4:

```
if ( motion_prediction_slice_present_flag == 0)) {
    alt_collocated_indication_flag =
    NumMotionPredRefLayers[nuh_layer_id] ? 1 : 0
    if (alt_collocated_indication_flag)
        collocated_ref_layer_idx =
        MotionPredRefLayerId[nuh_layer_id]
        [NumMotionPredRefLayers[nuh_layer_id]-1]
}
```

As illustrated in Pseudo Code 4, the inter layer motion information (e.g., instead of temporal motion information) may be used for temporal motion vector prediction (TMVP), if at least one motion prediction reference layer is available. The collocated reference layer may be set to the motion prediction reference layer closest to the current enhancement layer. Other motion prediction reference layer may be specified as the collocated reference layer. For example, instead of the closest reference layer, the lowest motion prediction reference layer, MotionPredRefLayerId[nuh_layer_id][0], may be used as the default collocated reference layer for the TMVP.

The syntax element inter_layer_sample_pred_only_flag equal to 1 may indicate that the inter prediction using temporal reference pictures in the EL may not be allowed when decoding of the current picture. The reference picture lists L0 and L1 may not include a temporal reference picture. The inter_layer_sample_pred_only_flag may be signaled in each of the slices regardless of the slice's network abstraction layer (NAL) unit type. Instantaneous decoder refresh (IDR) picture of enhancement layer (EL) may be a picture without inter prediction, using temporal reference pictures. The inter_layer_sample_pred_only_flag may be determined based on IDR NAL unit in the EL. The condition (e.g., (nal_unit_type!=IDR_W_RADL && nal_unit_type !=IDR_N_LP)) as illustrated in the Table 8 may be applied.

TABLE 8

| | Descriptor |
|---|---|
| slice_segment_header( ) { | |
| .... | |
|     if( NumSamplePredRefLayers[ nuh_layer_id ] > 0 && NumActiveRefLayerPics > 0 && (nal_unit_type != IDR_W_RADL && nal_unit_type != IDR_N_LP)) | |
|         inter_layer_sample_pred_only_flag | u(1) |
| .... | |
| } | |

When inter_layer_sample_pred_only_flag is equal to 1, the reference pictures available may be the inter-layer reference pictures. Since in SHVC the motion vectors from inter layer reference pictures may be equal to zero, the temporal motion vector prediction (TMVP) may be bypassed and each of the syntax elements in the slice header related to TMVP may be skipped. The inter_layer_sample_pred_only_flag may be utilized to skip motion prediction signaling.

A WTRU may determine reference pictures for inter-layer prediction without the use of the inter_layer_sample_pred_only_flag. For example, the WTRU may not receive the inter_layer_sample_pred_only_flag, but the WTRU may determine reference pictures that may be utilized for inter-layer prediction. The inference of inter-layer prediction, for example, without temporal prediction, by a WTRU may not rely on the inter_layer_sample_pred_only_flag. If the inter_layer_sample_pred_only_flag is not signaled in the bitstream (e.g., and/or not received by the WTRU), then the WTRU may infer temporal reference pictures. For example, the WTRU may detect that temporal reference pictures are not used for the current slice, for example, by examining the RPS (e.g., the flag used_by_curr_pic_flag, used_by_curr_pic_s0_flag and used_by_curr_pic_s1_flag in RPS may be set to 0). The temporal motion vector prediction (TMVP) process may be bypassed, for example, if temporal reference pictures are not used for coding of the current slice. For example, other related syntax elements may be skipped (e.g., may also be skipped).

The slice_temporal_mvp_enabled_flag may be signaled based on sps_temporal_mvp_enabled_flag (e.g., as provided in SHVC) and/or the inter_layer_sample_pred_only_flag for the enhancement layer (e.g., nuh_layer_id>0). Table 9 illustrates an example of such signaling. For example, the variable InterRefEnabledInRPLFlag may be derived as follows: If NumSamplePredRefLayers[nuh_layer_id] and NumActiveRefLayerPics is greater than 0, InterRefEnabledInRPLFlag may be set equal to !inter_layer_sample_pred_only_flag; otherwise, InterRefEnabledInRPLFlag may be set equal to 1.

To condition slice_temporal_mvp_enabled_flag on inter_layer_sample_pred_only_flag, the signaling of inter_layer_sample_pred_only_flag and sample prediction syntax structure (e.g., as illustrated in Table 9) may be determined or signalled prior to slice_temporal_mvp_enabled_flag. When slice_temporal_mvp_enabled_flag is not signaled (for example because inter_layer_sample_pred_only_flag is set equal to 1), slice_temporal_mvp_enabled_flag may be inferred to be equal to 0.

When the slice_temporal_mvp_enabled_flag is 0, the syntax elements such as alt_collocated_indication_flag, collocated_ref_layer_idx, collocated_from_l0_flag and/or collocated_ref_idx may be skipped (e.g., as illustrated in Table 9).

TABLE 9

| | Descriptor |
|---|---|
| slice_segment_header( ) { | |
|   ... | |
|   if(!dependent_slice_segmanet_flag) { | |
|     if( num_extra_slice_header_bits > 0 ) | |
|       discardable_flag | u(1) |
|     for( i = 1; i < num_extra_slice_header_bits ; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( nuh_layer_id > 0 && NumDirectRefLayers[ nuh_layer_id ] > 0 ) { | |
|       inter_layer_pred_enabled_flag | u(1) |
|       if( inter_layer_pred_enabled_flag && NumDirectRefLayers[ nuh_layer_id ] > 1) { | |
|         if( !max_one_active_ref_layer_flag ) | |
|           num_inter_layer_ref_pics_minus1 | u(v) |
|         for( i = 0; i < NumActiveRefLayerPics; i++ ) | |
|           inter_layer_pred_layer_idc[ i ] | u(v) |
|       } | |
|     } | |
|     if( nal_unit_type != IDR_W_RADL && nal_unit_type != IDR_N_LP ) { | |
|       ... | |
|       if( NumSamplePredRefLayers[ nuh_layer_id ] > 0 && NumActiveRefLayerPics > 0 ) | |
|         inter_layer_sample_pred_only_flag | u(1) |
|       if( (sps_temporal_mvp_enabled_flag ) || (nuh_layer_id > 0 && InterRefEnabledInRPLFlag ) ) | |
|         slice_temporal_mvp_enabled_flag | u(1) |
|     } | |
|     if( slice_temporal_mvp_enabled_flag ) { | |
|       if( nuh_layer_id > 0 && NumActiveMotionPredRefLayers > 0 ) | |

TABLE 9-continued

|  | Descriptor |
|---|---|
|     alt_collocated_indication_flag | u(1) |
|     if( alt_collocated_indication_flag ) |  |
|         if( NumActiveMotionPredRefLayers > 1 ) |  |
|             collocated_ref_layer_idx | ue(v) |
|     else { |  |
|         if( slice_type = = B ) |  |
|             collocated_from_l0_flag | u(1) |
|         if( ( collocated_from_l0_flag && num_ref_idx_l0_active_minus1 > 0 ) \|\| |  |
|             ( !collocated_from_l0_flag && num_ref_idx_l1_active_minus1 > 0 ) ) |  |
|             collocated_ref_idx | ue(v) |
|     } |  |
| } |  |
| ... |  |
| } |  |

A signaling order where slice_temporal_mvp_enabled_flag may be signaled prior to inter_layer_sample_pred_only_flag, may be kept. A condition (InterRefEnabledInRPLFlag) may be applied for signaling the TMVP parameters as is illustrated in Table 10. The derivation of InterRefEnabledInRPLFlag may be specified in a video coding standard, e.g., SHVC. The variable InterRefEnabledInRPLFlag may be derived as follows: if NumSamplePredRefLayers[nuh_layer_id] is greater than 0 and NumActiveRefLayerPics is greater than 0, InterRefEnabledInRPLFlag may be set equal to !inter_layer_sample_pred_only_flag; otherwise, InterRefEnabledInRPLFlag may be set equal to 1. The value of slice_temporal_mvp_enabled_flag may be changed as follows: if InterRefEnabledInRPLFlag is equal to 0, slice_temporal_mvp_enabled_flag may be set equal to 0.

A video coding device (e.g., based on an SHVC coding standard) may signal one or more syntax elements (e.g., two syntax elements), alt_collocated_indication_flag and/or collocated_ref_layer_idx in the slice header to indicate the reference layer for inter-layer motion prediction. The original temporal motion vector prediction (TMVP) may use the syntax elements collocated_from_l0_flag, and collocated_ref_idx to indicate the reference picture used for the TMVP. The same signaling may be applied to inter-layer motion prediction, so that the redundant syntax elements alt_collocated_indication_flag and collocated_ref_layer_idx may be not be signaled (e.g., may be omitted). Table 11 illustrates an example general slice segment header syntax.

The alt_collocated_indication_flag and collocated_ref_layer_idx may be provided by a video coding stan-

TABLE 10

|  | Descriptor |
|---|---|
| slice_segment_header( ) { |  |
|     ... |  |
|     if( NumSamplePredRefLayers[ nuh_layer_id ] > 0 && NumActiveRefLayerPics > 0 ) |  |
|         inter_layer_sample_pred_only_flag | u(1) |
|     ... |  |
|     if( slice_temporal_mvp_enabled_flag && InterRefEnabledInRPLFlag) { |  |
|         if( nuh_layer_id > 0 && NumActiveMotionPredRefLayers > 0 ) |  |
|             alt_collocated_indication_flag | u(1) |
|         if( alt_collocated_indication_flag ) |  |
|             if( NumActiveMotionPredRefLayers > 1 ) |  |
|                 collocated_ref_layer_idx | ue(v) |
|         else { |  |
|             if( slice_type = = B ) |  |
|                 collocated_from_l0_flag | u(1) |
|             if( ( collocated_from_l0_flag && num_ref_idx_l0_active_minus1 > 0 ) \|\| |  |
|                 ( !collocated_from_l0_flag && num_ref_idx_l1_active_minus1 > 0 )) |  |
|                 collocated_ref_idx | ue(v) |
|             } |  |
|         } |  |
|     ... |  |
| } |  |

The derivation process for temporal luma motion vector prediction may be changed, and the variables mvLXCol and availableFlagLXCol may be derived. For example, slice_temporal_mvp_enabled_flag is equal to 0 or InterRefEnabledInRPLFlag is equal to 0, the components of mvLXCol (e.g., both components) may be set equal to 0, and availableFlagLXCol may be set equal to 0.

dard, e.g., HEVC. Some of the inter-layer reference pictures used for TMVP may not be used for sample prediction. The index of the inter layer reference picture in the reference picture list may be used to indicate the inter-layer collocated reference picture for TMVP. The index of the inter layer reference picture in the reference picture list may not be used for inter layer sample prediction. A bitstream restriction may be imposed that a reference index that corresponds to an inter layer reference picture may not be referred to by any prediction blocks of the enhancement layer picture.

TABLE 11

| | Descriptor |
|---|---|
| slice_segment_header( ) { | |
| ... | |
|   if( NumSamplePredRefLayers[ nuh_layer_id ] > 0 && NumActiveRefLayerPics > 0 ) | |
|     inter_layer_sample_pred_only_flag | u(1) |
| ... | |
|   if( slice_temporal_mvp_enabled_flag) { | |
|     if( nuh_layer_id > 0 && NumActiveMotionPredRefLayers > 0) | |
|       alt_collocated_indication_flag | u(1) |
|     if( alt_collocated_indication_flag ) | |
|       if( NumActiveMotionPredRefLayers > 1 ) | |
|         collocated_ref_layer_idx | ue(v) |
|     else { | |
|       if( slice_type = = B ) | |
|         collocated_from_l0_flag | u(1) |
|       if( ( collocated_from_l0_flag && num_ref_idx_l0_active_minus1 > 0 ) \| \| ( !collocated_from_l0_flag && num_ref_idx_l1_active_minus1 > 0 ) ) | |
|         collocated_ref_idx | ue(v) |
|     } | |
|   ... | |
| } | |

Systems and/or methods for signaling SNR scalability may be provided. In such systems and/or methods, such signaling may differentiate between different scalabilities. For example spatial scalability may be differentiated from SNR scalability, and vice-versa. In an example embodiment, an indicator, flag, or other identifier or information may differentiate SNR from spatial scalability. Additionally, based on an indicator such as a SNR scalability indictor, such signaling may indicate whether to invoke or perform a resampling process (e.g., for a sample) and/or motion prediction.

As described herein, existing international video standards such as MPEG-2 Video, H.263, MPEG4 Visual and H.264 each may include or have tools and/or profiles that support scalability modes. However, HEVC may not currently support such scalable coding that may be supported by those existing standards. As such, HEVC may be extended to support such scalability coding including at least one of the following: spatial scalability (i.e., the scalable bitstream may signals at more than one spatial resolution), quality scalability (i.e., the scalable bitstream includes signals at more than one quality level), and standard scalability (i.e., the scalable bitstream includes a base layer coded using H.264/AVC and one or more enhancement layers coded using HEVC). In example embodiments, the quality scalability that may be supported by HEVC may also include SNR scalability. Additionally, as 3D video becomes more popular nowadays, additional extensions of scalability (e.g., the scalable bitstream including 2D and/or 3D video signals) may further be provided and/or used (e.g., as described or defined in MPEG).

A common specification for the scalable and multi-view extensions of HEVC may include a reference index base framework for the scalable extensions of HEVC (SHVC). In such a framework, syntax, semantics and decoding processes for SHVC may be provided. The reference index based framework may keep one or more operations of a block level and below intact such that the existing single layer codec logics may be reused within the scalable coding system. The framework may simplify the scalable codec design, and may further be flexible to support different types of scalabilities by incorporating high level syntax signaling and inter-layer processing module to achieve coding efficiency. Various new high level syntax changes may be provided and/or to support inter-layer processing and the multi-layer signaling of SHVC.

To signal such scalabilities in HEVC, systems and/or methods as described herein may be provided. For example, spatial scalability may be differentiated from SNR scalability, and vice-versa. In an example embodiment, an indicator, flag, or other identifier or information may differentiate SNR from spatial scalability. Additionally, based on an indicator such as a SNR scalability indictor, such signaling may indicate wither to invoke or perform a resampling process (e.g., for a sample) and/or motion prediction.

Scalable video coding may support multiple layers, and each layer may support spatial scalability, temporal scalability, SNR (Signal-to-Noise Ratio) scalability, and/or any other type of scalability. A scalable bit stream may have mixed scalability layers and each enhancement layer may depend on one or more lower layers to be decoded. An inter-layer process may generate the inter-layer reference picture (ILR) sample and/or motion field information to enhance or improve the enhancement layer coding efficiency.

SNR scalability signaling may be provided and/or used. For spatial scalability, video may be coded at different resolutions and at different layers. For example, a base layer video may have 720p resolution and an enhancement layer may have 1080p resolution. Additionally, for SNR scalability, video resolution may be the same across multiple layers, but different layers may be coded at different qualities. For example the base layer may be coded at 33 dB, whereas the enhancement layer may be coded at 36 dB. In SHVC, a syntax element such as scalability_mask, may be included in a parameter set (e.g., a Video Parameter Set (VPS)) to differentiate between multiview scalability and spatial/SNR scalability (e.g., as shown in Table 12).

TABLE 12

| Mapping of ScalabiltyId to scalability dimensions | | |
|---|---|---|
| scalability_mask index | Scalability dimension | ScalabilityId mapping |
| 0 | Multiview | ViewId |
| 1 | spatial/SNR scalability | DependencyId |
| 2-15 | Reserved | |

However, currently in SHVC, the scalability_mask syntax may not differentiate between spatial and SNR scalability. For example, the spatial scalability and SNR scalability may be two different kinds of scalabilities that may use different codec operations and memory allocations. Some examples of these differences may be as follows. The re-sampling process for reference layer picture samples and reference layer motion field may be used for spatial scalability but may not be used for SNR scalability. Additionally, some inter-layer filters such as a fixed alternative resampling filter (e.g., being evaluated in core experiment SCE3) may achieve improved performance gain on SNR scalability, but may not be applicable to spatial scalability. An application may use single-loop design (e.g., which may have been supported by SVC, the scalable extension of H.264) for SNR scalability and not spatial scalability. A sampling grid (e.g., currently undergoing in core experiment SCE1) may address particular issues related to spatial scalability, but not SNR scalability.

Systems, methods, and instrumentalities are described herein that may differentiate between spatial and SNR scalability in the high level syntax such that that the encoder and decoder operations may be configured and/or initialized according to the relevant coding tools that may be supported.

For example, currently in SHVC, SNR scalability may be inferred from a scale factor such as a ScaleFactorX that may be specified in a resampling process (e.g., such as the resampling process described in G.8.1.4 of JCTVC-M1008, SHVC Working Draft, April 2013). When the ScaleFactorX is equal to 1, the scalability may be the SNR scalability. The scalability may be derived after parsing the SPS and SPS extension. Other signaling options may be provided to address the signaling of SNR scalability and the resampling process such that redundant codec operations and memory allocation and/or access may be reduced or avoided (e.g., by avoiding parsing).

Separate scalability dimension may be assigned to the spatial and SNR scalability, e.g., to differentiate between spatial and SNR scalability. Table 13 illustrates an example embodiment of a modified scalability dimension table where spatial and SNR scalability may have distinct or separate values.

TABLE 13

Proposed Mapping of ScalabiltyId to scalability dimensions

| scalability_mask index | Scalability dimension | ScalabilityId mapping |
|---|---|---|
| 0 | multiview | ViewId |
| 1 | Spatial scalability | DependencyId |
| 2 | SNR scalability | SnrId |
| 3-15 | Reserved | |

As shown in Table 13, besides ViewId and DependencyId, a variable SnrId[layer_id_in_nuh[i]] may be provided and/or used as the SNR identifier of the i-th layer. According to an example embodiment, the SnrId may be derived as follows:

```
for (i = 0; i <= vps_max_layers_minus1; i++) {
    for( smIdx= 0, j =0; smIdx< 16; smIdx ++ )
        if( ( i ! = 0 ) && scalability_mask[ smIdx ] )
            ScalabilityId[ i ][ smIdx ] = dimension_id[ i ][ j++ ]
        else
            ScalabilityId[ i ][ smIdx ] = 0
    ViewId[ layer_id_in_nuh[ i ] ] = ScalabilityId[ i ][ 0 ]
    DependencyId [ layer_id_in_nuh[ i ] ] = ScalabilityId[ i ][ 1 ]
    SnrId [ layer_id_in_nuh[ i ] ] = ScalabilityId[ i ][ 2 ]
}
```

Additionally, e.g., to differentiate between spatial and SNR scalability, an SNR scalability flag may be provided and/or used. For example, an SNR scalability flag may be added in a parameter set extension (e.g., a Video Parameter Set (VPS) extension) to indicate the SNR scalability as shown in Table 14.

TABLE 14

| Video parameter set extension syntax | Descriptor |
|---|---|
| vps_extension( ) { | |
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 1; i <= vps_max_layers_minus1; i++ ) { | |
|     if( vps_nuh_layer_id_present_flag ) | |
|       layer_id_in_nuh[ i ] | u(6) |
|     if( !splitting_flag) | |
|       for( j = 0; j < NumScalabilityTypes; j++ ) | |
|         dimension_id[ i ][ j ] | u(v) |
|   } | |
|   for( i = 1; i <= vps_max_layers_minus1; i++) | |
|     for( j = 0; j < i; j++) | |
|       direct_dependency_flag[ i ][ j ] | u(1) |
|   for( i = 0; i< vps_max_layers_minus1; i++ ) | |
|     max_sublayer_for_ilp_plus1[ i ] | u(3) |
|   for( lsIdx = 1; lsIdx <= vps_num_layer_sets_minus1; lsIdx ++ ) { | |
|     vps_profile_present_flag[ lsIdx ] | u(1) |
|     if( !vps_profile_present_flag[ lsIdx ] ) | |
|       profile_layer_set_ref_minus1 [ lsIdx ] | ue(v) |
|     profile_tier_level( vps_profile_present_flag[ lsIdx ], | |
|   vps_max_sub_layers_minus1) | |
|   } | |

TABLE 14-continued

Video parameter set extension syntax

| | Descriptor |
|---|---|
| num_output_layer_sets | ue(v) |
| for( i = 0; i < num_output_layer_sets; i++ ) { | |
|     output_layer_set_idx_minus1[ i ] | ue(v) |
|     lsIdx = output_layer_set_idx_minus1[ i ] + 1 | |
|     for( j = 0 ; j <= vps_max_layer_id; j++) | |
|         if( layer_id_included_flag[ lsIdx ][ j ] ) | |
|             output_layer_flag[ lsIdx ][ j ] | u(1) |
| } | |
| max_one_active_ref_layer_flag | u(1) |
| direct_dep_type_len_minus2 | ue(v) |
| for( i = 1; i <= vps_max_layers_minus1; i++ ) | |
|     for( j = 0; j < i; j++ ) | |
|         if( direct_dependency_flag[ i ][ j ] ) { | |
|             SNR_scalability_flag[i][j] | u(1) |
|             direct_dependency_type[ i ][ j ] | u(v) |
| } | |
| } | |

According to an example embodiment, if or when the SNR_scalability_flag is equal to 1, the scalability between layers with a nuh_layer_id equal to a layer_id_in_nuh[i] and the nuh_layer_id equal to layer_id_in_nuh[j] may specify or may indicate the SNR scalability. If or when the SNR_scalability_flag is equal to 0, the scalability between layers with the nuh_layer_id equal to layer_id_in_nuh[i] and the nuh_layer_id equal to layer_id_in_nuh[j] may not be the SNR scalability (e.g., may not specific or indicate SNR scalability). Additionally, if or when SNR_scalability_flag is not provided, it may be inferred to be equal to 0.

As described herein, decoding may be performed, for example, as part of a resampling process. A decoding process associated with an example resampling process may be performed as follows. If PicWidthInSamplesL is equal to RefLayerPicWidthInSamplesL, PicHeightInSamplesL is equal to RefLayerPicHeightInSamplesL, and each of the values of ScaledRefLayerLeftOffset, the ScaledRefLayerTopOffset, ScaledRefLayerRightOffset and/or ScaledRefLayerBottomOffset are equal to 0, rsPicSample may be set to rlPicSample and rsPicMotion may be set equal to rlPicMotion, e.g., when alt_collocated_indication_flag may be equal to 1. rsPic may be derived as follows. The picture sample resampling process (e.g., as specified in subclause G.8.1.4.1 of JCTVC-M1008, SHVC Working Draft, April 2013) may be invoked with the sample values of rlPicSample as an input, and with the resampled sample values of rsPicSample as an output. When the alt_collocated_indication_flag is equal to 1, the picture motion field resampling process (e.g., as specified in subclause G.8.1.4.2 of JCTVC-M1008, SHVC Working Draft, April 2013) may be invoked with rlPicMotion as an input, and with the resampled motion field of rsPicMotion as an output.

Using the SNR_scalability_flag, described herein, the example resampling process may be provided as follows. For example, if the SNR_scalability_flag is set to 1, rsPicSample may be set to be equal to rlPicSample. Additionally, when the alt_collocated_indication_flag may be equal to 1 and if the SNR_scalability_flag is set to 1, rsPicMotion may be set to rlPicMotion. rsPic may be derived as follows. The picture sample resampling process (e.g., as specified in subclause G.8.1.4.1 of JCTVC-M1008, SHVC Working Draft, April 2013) may be invoked with the sample values of rlPicSample as an input, and with the resampled sample values of rsPicSample as an output. When the alt_collocated_indication_flag may be equal to 1, the picture motion field resampling process (e.g, as specified in subclause G.8.1.4.2 of JCTVC-M1008, SHVC Working Draft, April 2013) may be invoked with rlPicMotion as input, and with the resampled motion field of rsPicMotion as output.

In example embodiments, one or more exceptions may be provided and/or present. One such exception may include or may be hybrid standard scalability where the base layer (BL) may be AVC coded. The video coding size may be different between HEVC EL and AVC BL. For example, when an AVC base layer (BL) and an HEVC enhancement layer (EL) may both encode a 1920×1080 video, the decoded BL reference picture size may be 1920×1088 while the enhancement coding picture size may be 1920×1080 (e.g., this is because AVC and HEVC standards apply different padding processes). Although the resampling of the luma and/or chroma sample may not be necessary, the decoded reference picture (1920×1088) may not be used directly to predict the EL picture (1920×1080) and the corresponding cropped region may be copied into the ILR picture.

There are multiple methods that may be used as described herein to address such an exception. For example, in a method, the SNR_scalability_flag may be restricted to 1 when both the BL and EL video coding size may be the same regardless the values of one or more scaled offsets. Such restriction may be provided and/or imposed in the form of a bitstream conformance restriction to ensure that the encoder may set the value of SNR_scalability_flag properly. In that case, the SNR_scalability_flag may be set to 0 for the above 1920×1080 hybrid standard scalability and the inter-layer reference picture may be derived from the 1920×1088 AVC base layer picture according to the resampling process (e.g., as specified in SHVC WD G.8.1.4.1 of JCTVC-M1008, SHVC Working Draft, April 2013).

In a method, the SNR_scalability_flag may be set to 1 when the scale factor, ScaleFactorX (e.g., as specified in G.8.1.4) may be equal to 1. In such method, the resampling process may be further modified to cover the special cases as follows. In addition to the rlPic and rsPic (e.g., as defined in SHVC WD G.8.1.4), another cropped reference layer picture rcPic may be added in the resampling process. The variables CroppedRefLayerPicWidthInSamplesL and CroppedRefLayerPicWidthinSamplesL may be set to be equal to the width and height of rcPic in units of luma samples respectively. The variable rcPicSample may further be defined as a group of sample arrays specifying the sample values of rcPic of the luma and chroma components. Additionally, the rcPicMotion may be defined as a group of variable arrays specifying the compressed motion field of rcPic.

The variables RefLayerPicWidthInSamplesL and RefLayerPicHeightInSamplesL may be set equal to the width and height of the decoded reference layer picture rlPic in units of luma samples respectively. The luma samples location [xP][yP] may specify the top-left sample of the rlPic. Additionally, the variable rcLeftStart, rcRightEnd, rcTopStart and rcBottomEnd may be derived as follows:

*rc*LeftStart=*xP*+ScaledRefLayerLeftOffset

*rc*RightEnd=*xP*+(RefLayerPicWidthInSamples*L*−1)+ ScaledRefLayerRightOffset

*rc*TopStart=*yP*+ScaledRefLayerTopOffset

Figure 5:
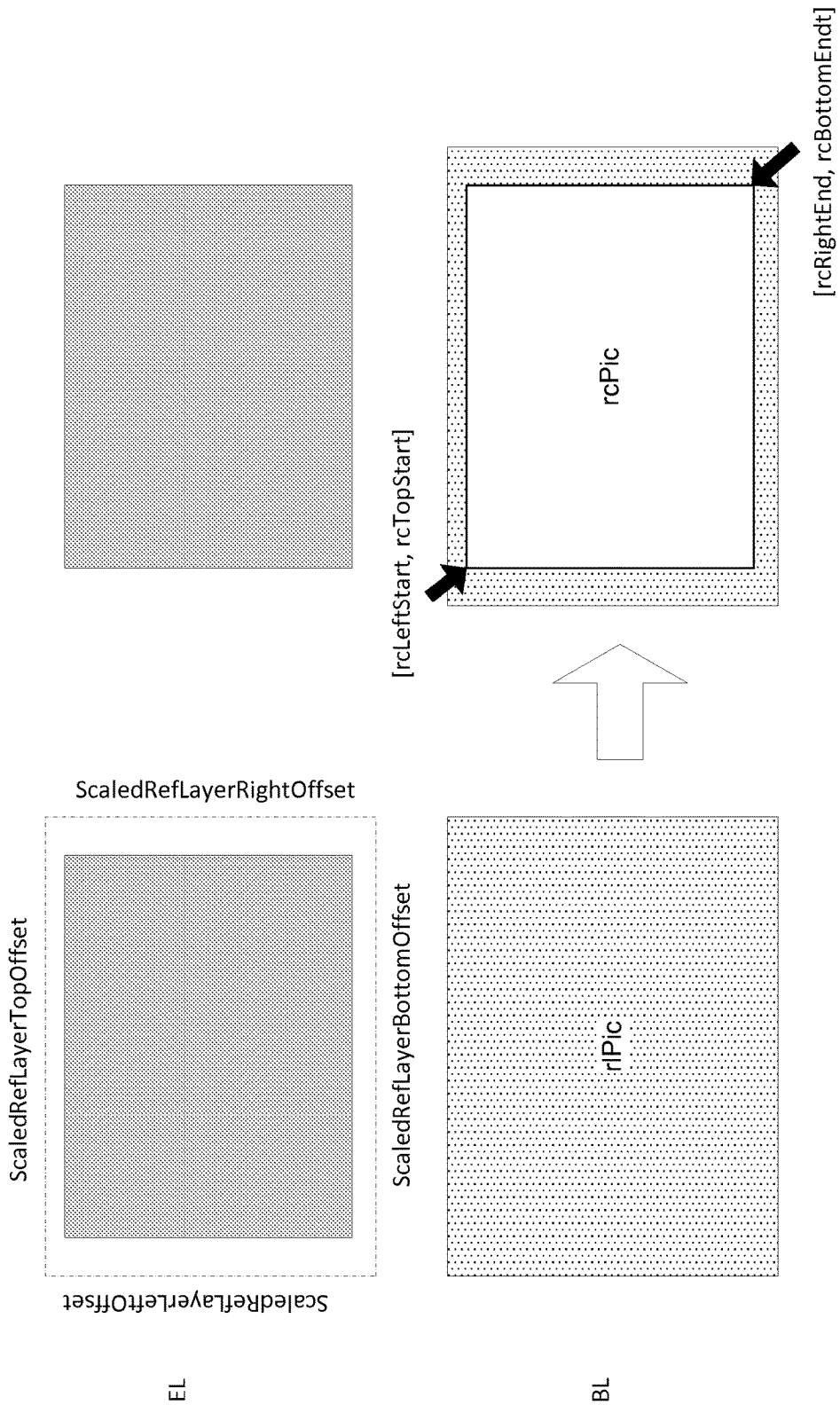
FIG. 5 illustrates an example of reference picture cropping.

*rc*BottomEnd=*yP*+(RefLayerPicHeightInSamples*L*− 1)+ScaledRefLayerBottomOffset The rcPic may be derived by cropping the rlPic with the top-left position (rcLeftStart, rcTopStart) and bottom-right position (rcRightEnd, rcBottomEnd). FIG. 5 illustrates an example of cropping. As illustrated in FIG. 5, rcPic may be derived from rlPic when scaled offsets may not be zero.

The resampling process may be provided as follows. If SNR_scalability_flag may be set to 1, the rsPicSample may be set equal to rcPicSample and when the alt_collocated_ indication_flag may be equal to 1, the rsPicMotion may be set equal to rcPicMotion. The rsPic may be derived as follows. A picture sample resampling process (e.g., as specified in subclause G.8.1.4.1 of JCTVC-M1008, SHVC Working Draft, April 2013) may be invoked with the sample values of rlPicSample as an input and with the resampled sample values of rsPicSample as an output. The picture motion field resampling process (e.g., as specified in subclause G.8.1.4.2 of JCTVC-M1008, SHVC Working Draft, April 2013) may be invoked with rlPicMotion as an input and with the resampled motion field of rsPicMotion as an output, e.g., when the alt_collocated_indication_flag is equal to 1.

Spatial and SNR scalability may be distinguished, e.g., to avoid unnecessary resampling operations and/or memory allocation. An additional or extra syntax element may be signaled in a parameter set extension (e.g., a Video Parameter set (VPS) extension, as illustrated in Table 15) to indicate whether the resampling process may be bypassed or not.

TABLE 15

Video parameter set extension syntax

|  | Descriptor |
|---|---|
| vps_extension( ) { | |
|   while( !byte_aligned( ) ) | |
|     vps_extension_byte_alignment_reserved_one_bit | u(1) |
|   avc_base_layer_flag | u(1) |
|   splitting_flag | u(1) |
|   for( i = 0, NumScalabilityTypes = 0; i < 16; i++ ) { | |
|     scalability_mask[ i ] | u(1) |
|     NumScalabilityTypes += scalability_mask[ i ] | |
|   } | |
|   for( j = 0; j < ( NumScalabilityTypes − splitting_flag ); j++ ) | |
|     dimension_id_len_minus1[ j ] | u(3) |
|   vps_nuh_layer_id_present_flag | u(1) |
|   for( i = 1; i <= vps_max_layers_minus1; i++ ) { | |
|     if( vps_nuh_layer_id_present_flag ) | |
|       layer_id_in_nuh[ i ] | u(6) |
|     if( !splitting_flag ) | |
|       for( j = 0; j < NumScalabilityTypes; j++ ) | |
|         dimension_id[ i ][ j ] | u(v) |
|   } | |
|   for( i = 1; i <= vps_max_layers_minus1; i++ ) | |
|     for( j = 0; j < i; j++ ) | |
|       direct_dependency_flag[ i ][ j ] | u(1) |
|   for( i = 0; i< vps_max_layers_minus1; i++ ) | |
|     max_sublayer_for_ilp_plus1[ i ] | u(3) |
|   for( lsIdx = 1; lsIdx <= vps_num_layer_sets_minus1; lsIdx ++ ) { | |
|     vps_profile_present_flag[ lsIdx ] | u(1) |
|     if( !vps_profile_present_flag[ lsIdx ] ) | |
|       profile_layer_set_ref_minus1[ lsIdx ] | ue(v) |
|     profile_tier_level( vps_profile_present_flag[ lsIdx ], | |
|   vps_max_sub_layers_minus1) | |
|   } | |
|   num_output_layer_sets | ue(v) |
|   for( i = 0; i < num_output_layer_sets; i++ ) { | |
|     output_layer_set_idx_minus1[ i ] | ue(v) |
|     lsIdx = output_layer_set_idx_minus1[ i ] + 1 | |
|     for( j = 0 ; j <= vps_max_layer_id; j++) | |
|       if( layer_id_included_flag[ lsIdx ][ j ] ) | |
|         output_layer_flag[ lsIdx ][ j ] | u(1) |
|   } | |
|   max_one_active_ref_layer_flag | u(1) |

TABLE 15-continued

Video parameter set extension syntax

| | Descriptor |
|---|---|
| direct_dep_type_len_minus2 | ue(v) |
|   for( i = 1; i <= vps_max_layers_minus1; i++ ) | |
|     for( j = 0; j < i; j++ ) | |
|       if( direct_dependency_flag[ i ][ j ] ) { | |
|         direct_dependency_type[ i ][ j ] | u(v) |
|         if ((((direct_dependency_type[i][j]+1) & 1) ‖ ((((direct_dependency_type[i][j]+1) & 2) >> 1)) | |
|           resampling_buffer_enable_flag[i][j] | u(1) |
|       } | |
| } | |

A resampling_buffer_enable_flag[i][j] that may be equal to 0 may indicate or specify that the resampling process between the i-th layer and the j-th layer may be bypassed and no resampling buffer may be allocated. A resampling_buffer_enable_flag that may be equal to 1 may indicate or specify that a related buffer for the resampling process of picture sample or motion values may be invoked. When a resampling_buffer_enable_flag may not be present, the default value may be 0. The resampling process may be modified as follows. If the resampling_buffer_enable_flag may be set to 0, the rsPicSample may be set equal to rlPicSample and when the alt_collocated_indication_flag may be equal to 1, the rsPicMotion may be set equal to rlPicMotion. The rsPic may be derived as follows. A picture sample resampling process (e.g., as specified in subclause G.8.1.4.1 of JCTVC-M1008, SHVC Working Draft, April 2013) may be invoked with the sample values of rlPicSample as an input, and with the resampled sample values of rsPicSample as an output. Additionally, when the alt_collocated_indication_flag may be equal to 1, a picture motion field resampling process (e.g., as specified in subclause G.8.1.4.2 of JCTVC-M1008, SHVC Working Draft, April 2013) may be invoked with rlPicMotion as an input, and with the resampled motion field of rsPicMotion as an output.

The resampling_buffer_enable_flag may not be coupled with a direct_dependency_type syntax element. The resampling_buffer_enable_flag may be signaled (e.g., signaled independently) as illustrated in Table 17). The resampling_buffer_enable_flag may offer the flexibility such that the resampled reference picture and motion may be used for a purpose other than sample prediction and/or motion prediction. For example, the resampled motion may be used to generate hybrid inter-layer reference picture.

TABLE 16

Video parameter set extension syntax

| | Descriptor |
|---|---|
| vps_extension( ) { | |
|   .... | |
|   max_one_active_ref_layer_flag | u(1) |
|   direct_dep_type_len_minus2 | ue(v) |
|   for( i = 1; i <= vps_max_layers_minus1; i++ ) | |
|     for( j = 0; j < i; j++ ) | |
|       if( direct_dependency_flag[ i ][ j ] ) { | |
|         direct_dependency_type[ i ][ j ] | u(v) |
|         resampling_buffer_enable_flag[i][j] | u(1) |
|       } | |
| } | |

The resampling_buffer_enable_flag may not be coupled with a direct_dependency_type syntax element. The resampling_buffer_enable_flag may be signaled (e.g., signaled independently) as SNR_scalability_flag and resampling_buffer_enable_flag, may be placed in SPS or SPS extensions or any other appropriate parameter set as well. Table 17 illustrates an example embodiment of signaling the SNR scalability flag in an SPS extensions. The syntax element num_SNR_scalability_flags as illustrated in Table 17 may indicate the number of signaled flags. The value of num_SNR_scalability_flags may be equal to the number of reference layers of the current enhancement layer. The value of num_scaled_ref_layer_offsets may be equal to the number of reference layers of the current enhancement layer. As illustrated in Table 19, the syntax elements num_SNR_scalability_flags and num_scaled_ref_layer_offsets may be combined and signaled as one syntax element, e.g., num_ref_layers.

TABLE 17

Sequence parameter set extension syntax

| | Descriptor |
|---|---|
| sps_extension( ) { | |
|   inter_view_mv_vert_constraint_flag | u(1) |
|   num_SNR_scalability_flags | ue(v) |
|   for (j = 0; j < num_SNR_scalability_flags; j ++) | |
|     SNR_scalability_flag[j] | u(1) |
|   num_scaled_ref_layer_offsets | ue(v) |
|   for( i = 0; i < num_scaled_ref_layer_offsets; i++) { | |
|     scaled_ref_layer_left_offset[i] | se(v) |
|     scaled_ref_layer_top_offset[i] | se(v) |
|     scaled_ref_layer_right_offset[i] | se(v) |
|     scaled_ref_layer_bottom_offset[i] | se(v) |
|   } | |
| } | |

With SNR scalability signaling, as described herein, the codec operation may signal one or more syntax elements to save number of bits signaled and thereby increase efficiency. For example, the SNR_scalability_flag, as described herein (e.g., that may be added to a VPS extension as described above), may be used in various application scenarios.

For example, sampling grid shift signaling may be provided and/or used, e.g., with a SNR_scalability_flag. The sampling grid shift information may be sampled using various techniques and/or methods (e.g., as proposed in JCTVC-M0465, "Signaling of phase offset in up-sampling process and chroma sampling location," April, 2013). For example, sampling grid information may be signaled in an SPS extension with a phase offset present flag and luma and/or chroma phase offset parameters. Since sampling phase shift may be applicable to spatial scalability, the proposed SNR_scalability_flag may be used as a condition to avoid unnecessary syntax elements present in the bitstream for the SNR scalability. Table 18 illustrates an example syntax table that may use SNR_scalability_flag signaling as a condition to determine whether extra sampling grid parameters may be signaled.

TABLE 18 proposed sampling grid information in SPS extension

|  | Descriptor |
|---|---|
| sps_extension ( ) {<br>    for ( j = 0; j <nuh_layer_id; j ++)<br>        SNR_scalability_flag[j]<br>        if (SNR_scalability_flag[j] == 0)<br>            sampling_grid_information( )<br>} |  |

A scaled reference layer offset may also be provided and/or used. For example, scaled ref layer offset syntax elements that may be signaled in SPS extension may be used to align the base layer and the enhancement layer. In SNR scalability, the scaled offsets may zero and, as such, by conditioning the signaling of these offsets on the SNR_scalability_flag, extra bits may be saved by skipping the scaled offset signaling for SNR scalable layers. Table 19 illustrates an example of such signaling.

TABLE 19

Sequence parameter set extension syntax

|  | Descriptor |
|---|---|
| sps_extension( ) {<br>  inter_view_mv_vert_constraint_flag<br>  num_ref_layers<br>  for( i = 0; i < num_ref_layers; i++) {<br>    SNR_scalability_flag[i]<br>    if(SNR_scalability_flag[i] == 0) {<br>      scaled_ref_layer_left_offset[i]<br>      scaled_ref_layer_top_offset[i]<br>      scaled_ref_layer_right_offset[i]<br>      scaled_ref_layer_bottom_offset[i]<br>    }<br>  }<br>} | <br>u(1)<br>ue(v)<br><br>u(1)<br><br>se(v)<br>se(v)<br>se(v)<br>se(v) |

The semantic of the num_ref_layer that may not be accurate to match the number of dependent layers (e.g., reference layers) signaled in VPS where the num_ref_layers may specify the number of sets of scaled reference layer offset parameters that may be present in the SPS. In an embodiment, the value of num_ref_layers may be in the range of 0 to 63, inclusive. The semantics may be modified as follows. The num_ref_layers may specify or indicate the number of sets of scaled reference layer offset parameters that may be present in the SPS. The value of num_ref_layers may be equal to NumDirectRefLayers[nuh_layer_id] (e.g., as a part of btistream conformance restriction, and as specified in F.7.4.3.1.1 of the JCTVC-M1008, SHVC Working Draft, April 2013).

Inter-layer filtering signaling may be provided and/or used. For example, a switchable integer position filter (e.g. such as the filter described in JCTVC-MO273, Non-SCE4 Switchable filter on integer position, April 2013 that may be provided in Core Experiment on inter layer filtering (SCE3)) may achieve a performance gain for SNR scalability, but not for spatial scalability. As such, various filter switching methods may be provided and/or used. For example, a filter switch may be signaled in a slice header, and, in an additional embodiment, both a ILR and filtered ILR may be inserted into a reference picture list (RPL) for inter-layer prediction. For example, the one bit syntax element in the slice header may be bypassed when the SNR_scalability_ flag is set to 0, e.g., since such filter may not improve the performance for spatial scalability scenarios. In another example, the number of active inter-layer reference picture may be reduced, when the SNR_scalability flag is set to 0, e.g., because the filtered ILR picture may not be added into the reference picture sets and the reference picture lists. Signaling the SNR scalability indicator may simplify the reference picture list construction process and may save DPB memory size in advance for spatial scalability case. The SNR_scalability_flag may be referred in the resampling process to bypass the switchable integer position filter (e.g. such as the filter described in JCTVC-MO273, Non-SCE4 Switchable filter on integer position, April 2013) for the spatial scalability (SNR_scalability_flag is set to 0) so as to reduce the codec operation complexity and memory allocation.

Multiple flags may be signaled in a parameter set (e.g., a Video Parameter Set). Each of the flags may indicate whether a resampling process associated with a layer (e.g., a base layer and a dependent enhancement layer) of a scalable bitstream needs to be performed. On a condition that a flag indicates that the resampling process is not needed, allocation of a resampling buffer may be by-passed. On a condition that the flag indicates that the resampling process is needed, one or more resampling buffers may be allocated and resampling of one or more of a reference picture sample or motion associated with a reference picture sample may be invoked.

The signaling described herein may be used, for example, in any of the networks or suitable network elements described herein. For example, the signaling described herein may be implemented in accordance with scalable video coding implemented by devices (e.g., video streaming devices) associated with a wireless communication system, such as the example wireless communication system 100 and/or components thereof illustrated in FIGS. 6A-6E.

Figure 6A:
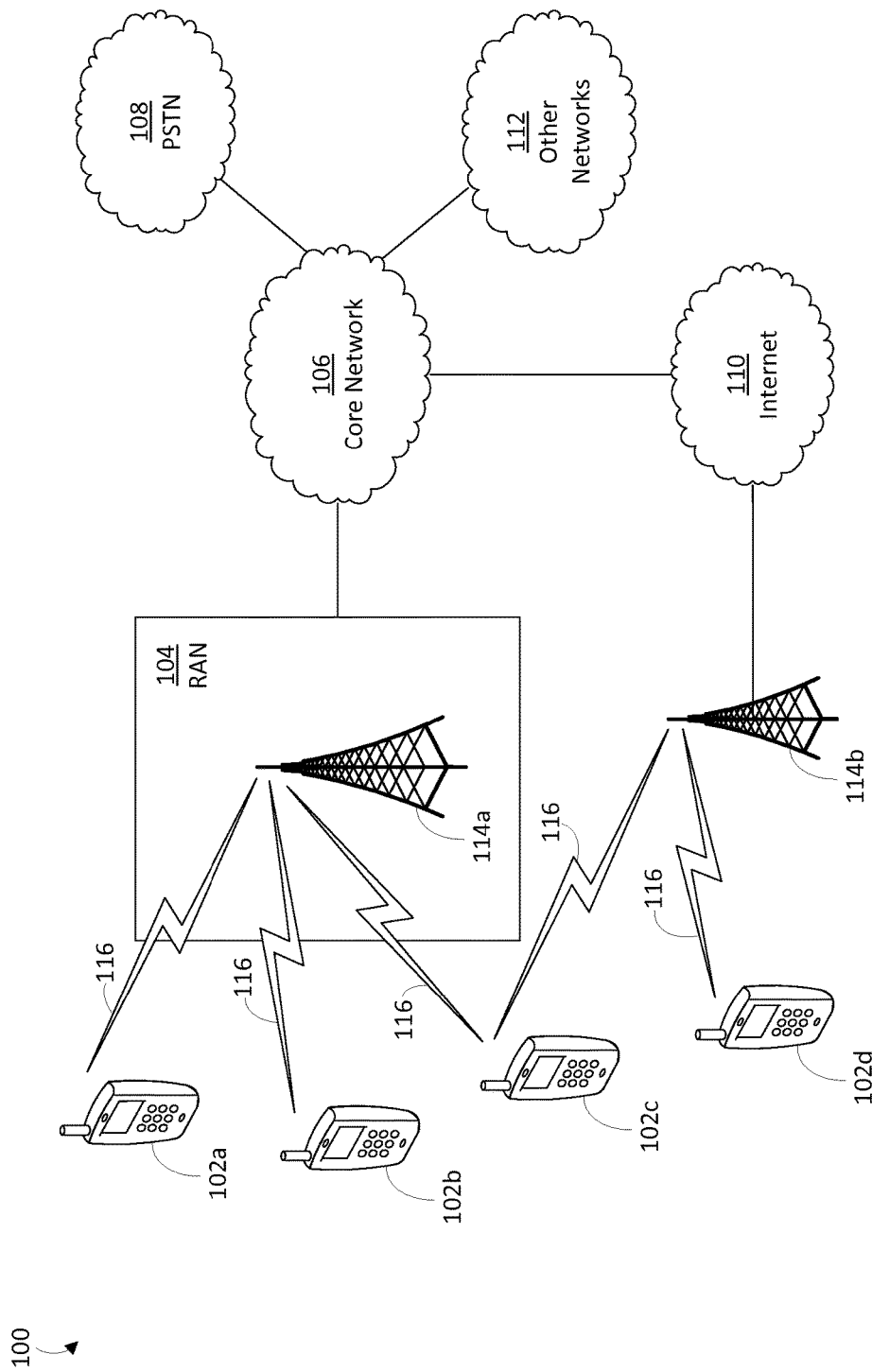
FIG. 6A is a system diagram of an example communications system in which one or more disclosed embodiments may be implemented.

FIG. 6A depicts a diagram of an example communications system 100 in which one or more disclosed embodiments may be implemented and/or may be used. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 6A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 10A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 6A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 6A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 6A may be configured to communicate with the base station 114a, which may employ a cellular-based radio technology, and with the base station 114b, which may employ an IEEE 802 radio technology.

Figure 6B:
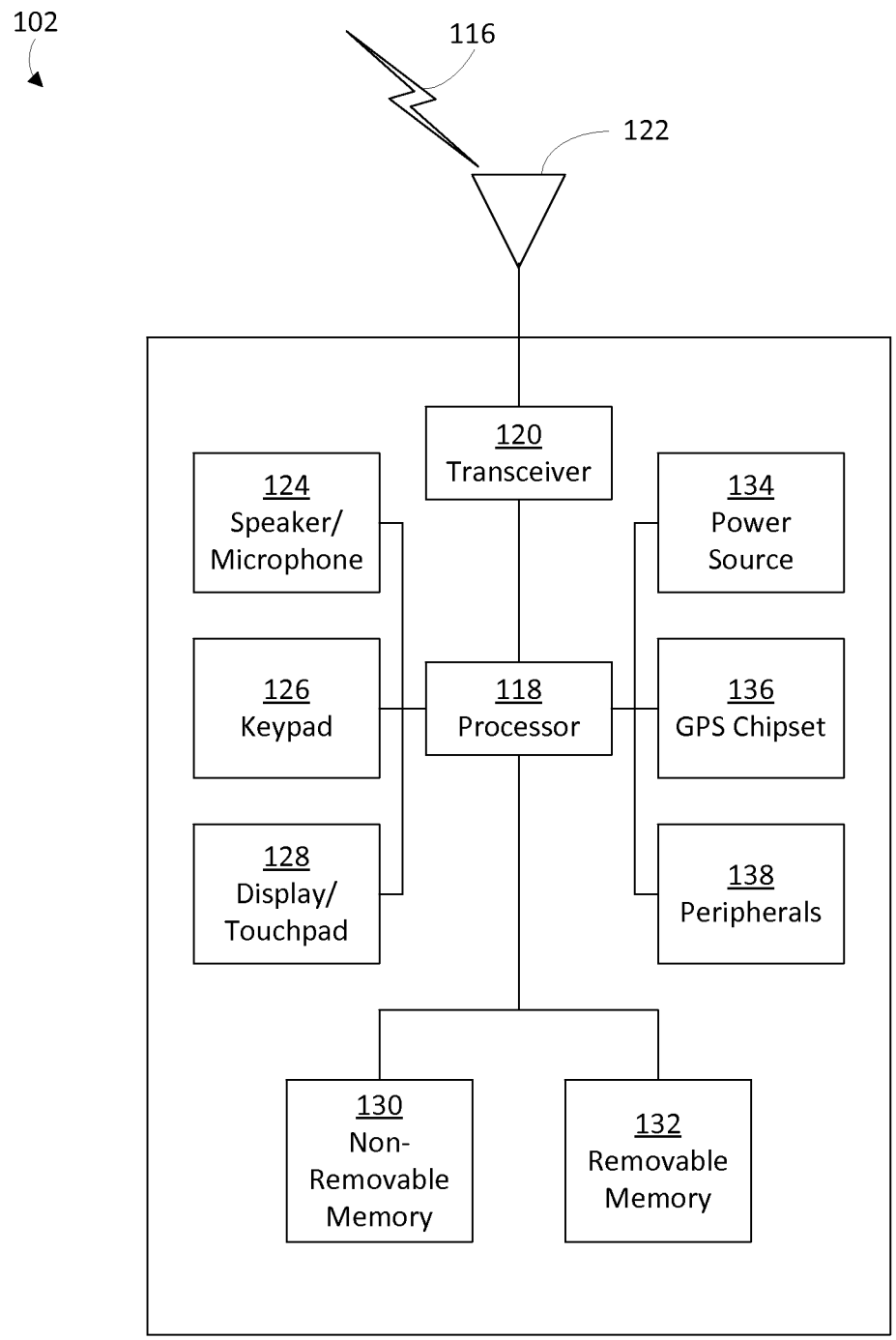
FIG. 6B is a system diagram of an example wireless transmit/receive unit (WTRU) that may be used within the communications system illustrated in FIG. 6A.

FIG. 6B depicts a system diagram of an example WTRU 102. As shown in FIG. 6B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 6B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 6B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 6B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 6C:
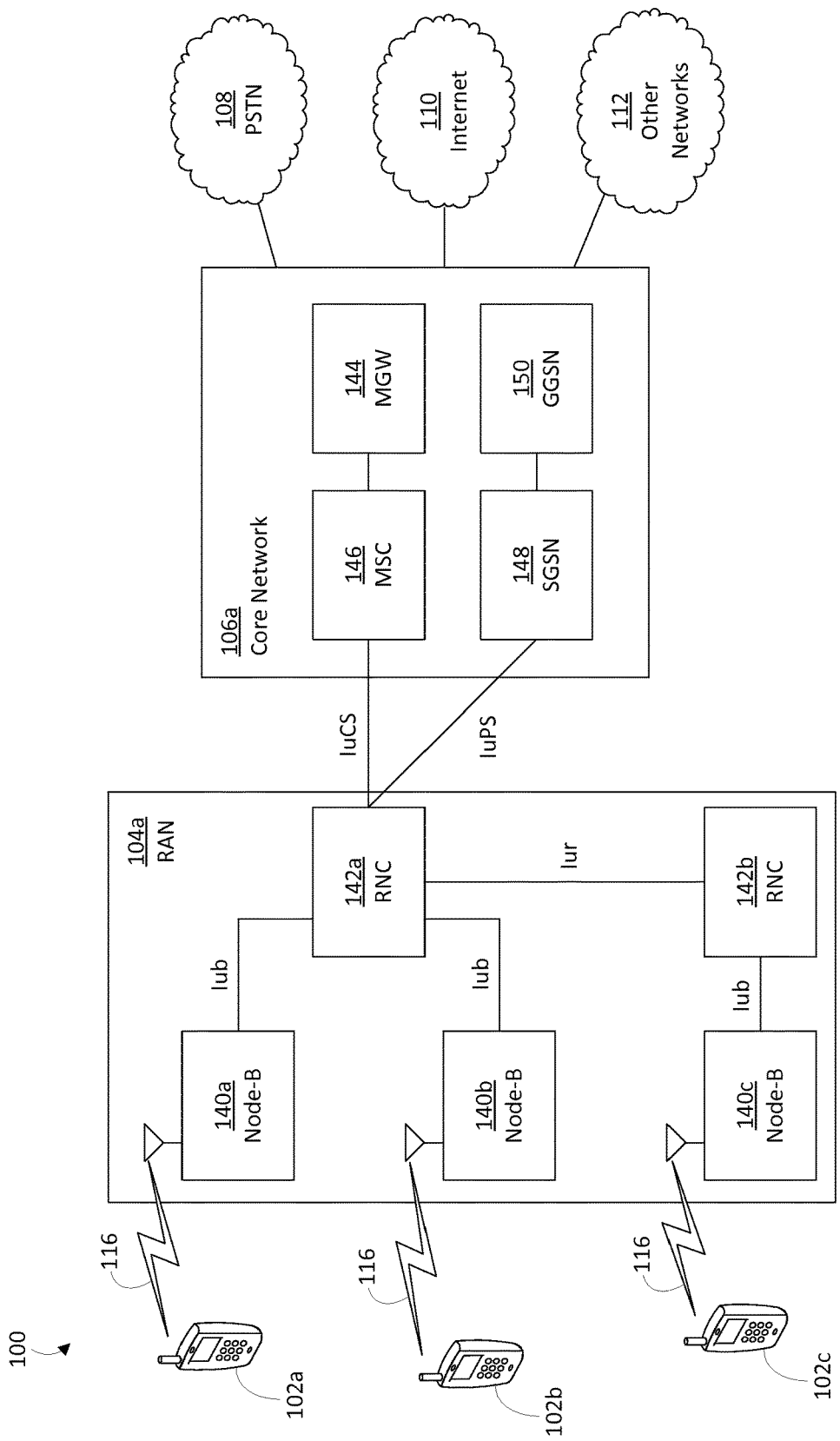
FIG. 6C is a system diagram of an example radio access network and an example core network that may be used within the communications system illustrated in FIG. 6A.

FIG. 6C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 6C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 6C, the Node-Bs 140a and/or 140b may be in communication with the RNC 142a. Additionally, the Node-B 140c may be in communication with the RNC142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 6C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 6D:
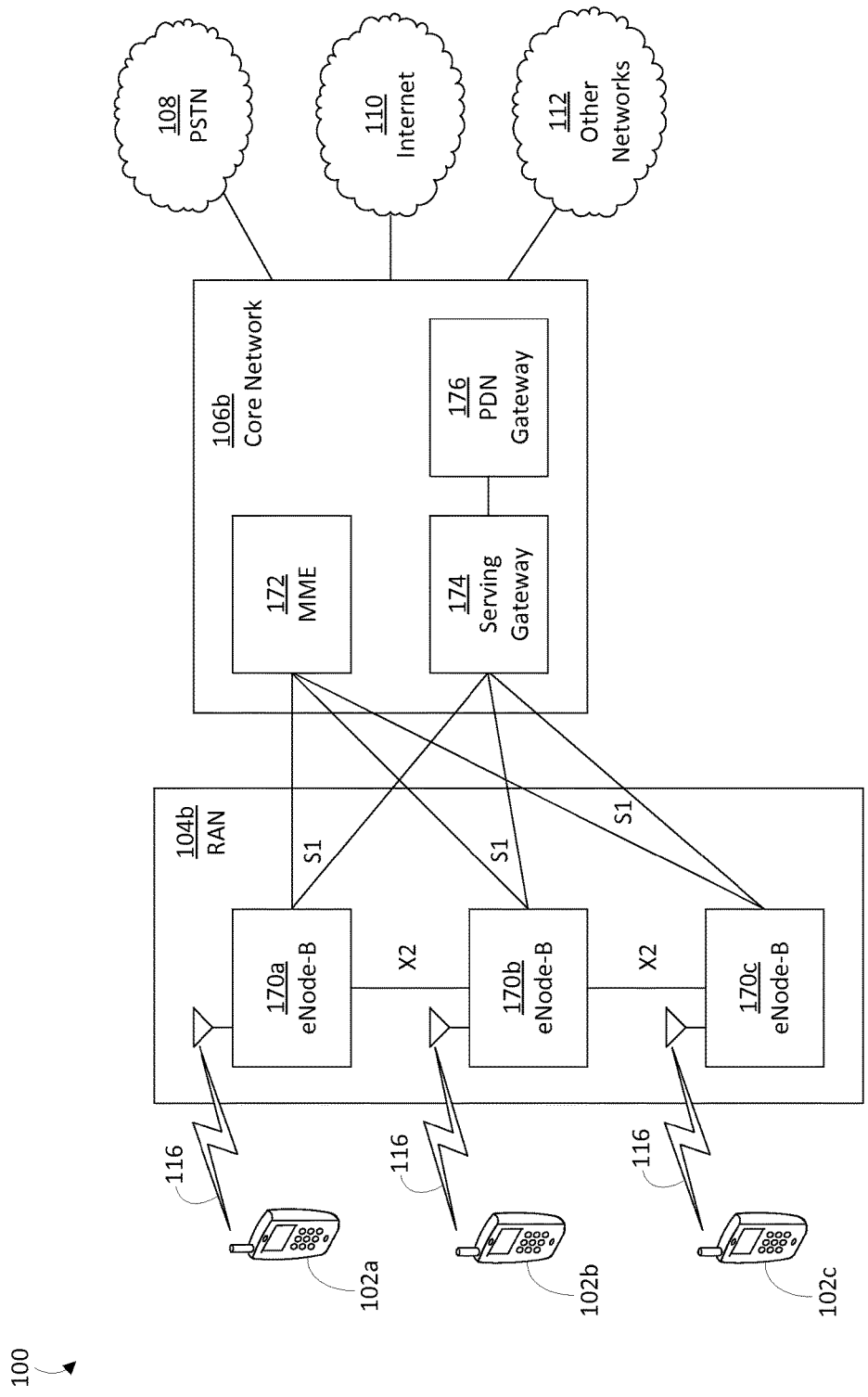
FIG. 6D is a system diagram of another example radio access network and another example core network that may be used within the communications system illustrated in FIG. 6A.

FIG. 6D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 6D, the eNode-Bs 160a, 160b, and/or 160c may communicate with one another over an X2 interface.

The core network 107 shown in FIG. 6D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 6E:
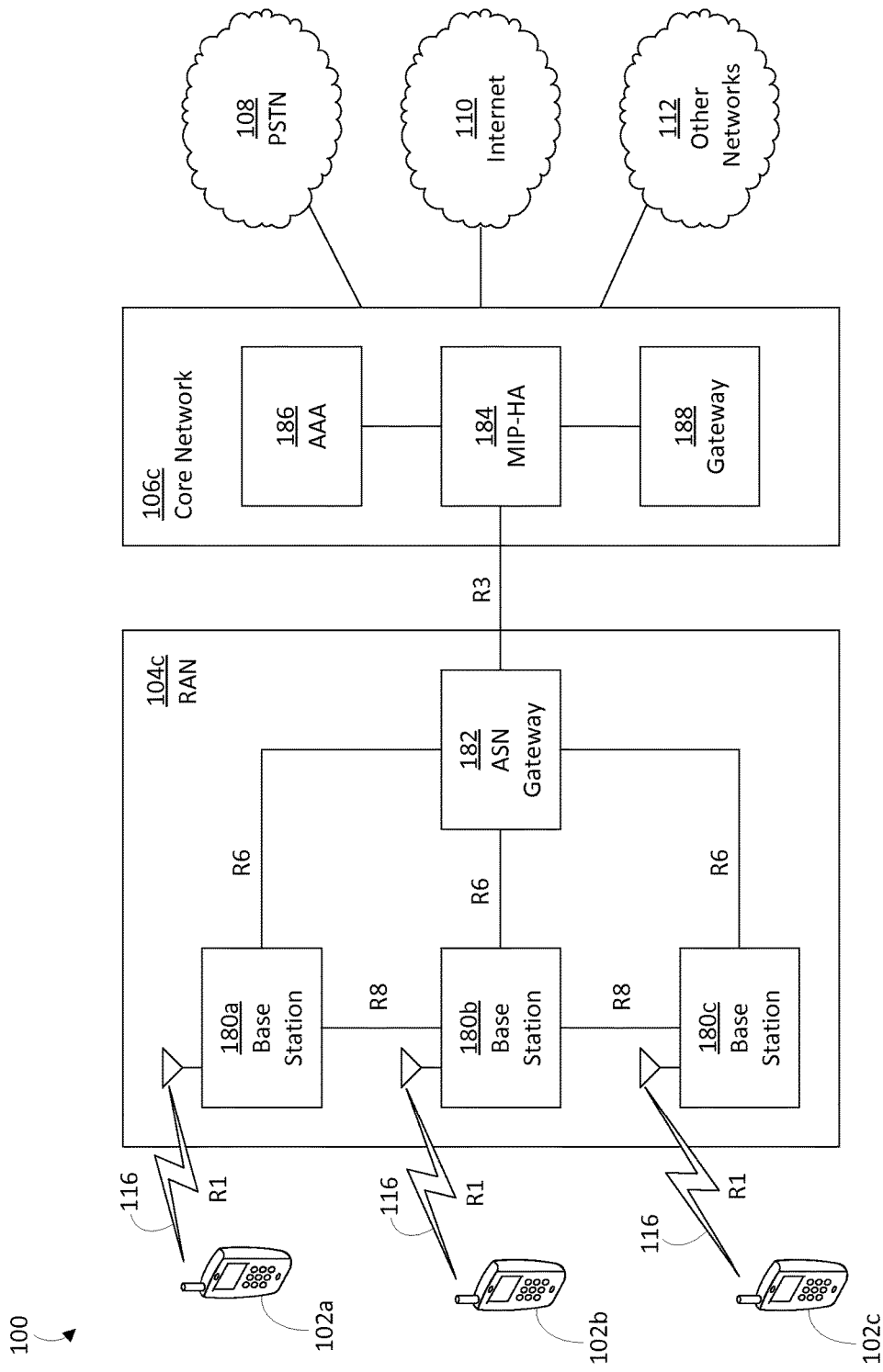
FIG. 6E is a system diagram of another example radio access network and another example core network that may be used within the communications system illustrated in FIG. 6A.

FIG. 6E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 6E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 6E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 6E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A video data processing method comprising:
   determining a number of active reference layers;
   comparing the number of active reference layers to a number of direct reference layers;
   determining, whether to include an indication of the active reference layers in a slice-level header based on the comparing of the number of active reference layers with the number of direct reference layers; and
   generating a bitstream comprising one or more layers, wherein on a condition that the number of active reference layers is not equal to the number of direct reference layers, including in the bitstream the indication of a picture that is used for inter-layer prediction, and
   on a condition that the number of active reference layers is equal to the number of direct reference layers, not including in the bitstream the indication of a picture that is used for inter-layer prediction.

2. The method of claim 1, wherein the indication is a layer ID of a picture.

3. A video encoding device comprising:
   a processor configured to:
   determine a number of active reference layers;
   compare the number of active reference layers to a number of direct reference layers;
   determine, whether to include an indication of the active reference layers in a slice-level header based on the comparing of the number of active reference layers with the number of direct reference layers; and
   generate a bitstream comprising one or more layers, wherein on a condition that the number of active reference layers is not equal to the number of direct reference layers, include in the bitstream the indication of a picture that is used for inter-layer prediction, and
   on a condition that the number of active reference layers is equal to the number of direct reference layers, not include in the bitstream the indication of a picture that is used for inter-layer prediction.

4. The video coding device of claim 3, wherein the indication is a layer ID of a picture.

5. A video decoding method comprising:
receiving a bitstream comprising one or more layers, wherein
on a condition that a number of active reference layers in the received bitstream is not equal to a number of direct reference layers, receiving in the bitstream an inter-layer prediction layer syntax element, wherein the inter-layer prediction layer syntax element indicates a list of reference picture layer IDs that can be used by a current picture of a current layer for inter-layer prediction, and
on a condition that a number of active reference layers in the received bitstream is equal to a number of direct reference layers, inferring an inter-layer prediction layer syntax element.

6. The method of claim 5 further comprising:
on a condition that the number of active reference layers is equal to the number of direct reference layers, inferring the inter-layer prediction layer syntax element from a layer ID of a direct reference layer of the current layer.

7. A video decoding device comprising:
a processor configured to:
receive a bitstream comprising one or more layers, wherein on a condition that a number of active reference layers in the received bitstream is not equal to a number of direct reference layers, receive in the bitstream an inter-layer prediction layer syntax element, wherein the inter-layer prediction layer syntax element indicates a list of reference picture layer IDs that can be used by a current picture of a current layer for inter-layer prediction, and
on a condition that a number of active reference layers in the received bitstream is equal to a number of direct reference layers, infer an inter-layer prediction layer syntax element.

8. The video decoding device of claim 7, on a condition that the number of active reference layers is equal to the number of direct reference layers the processor is further configured to infer the inter-layer prediction layer syntax element from a layer ID of a direct reference layer of the current layer.

* * * * *